(12) United States Patent
Naous

(10) Patent No.: US 12,488,038 B1
(45) Date of Patent: *Dec. 2, 2025

(54) AGGREGATING STREAMED NETWORK LOG MESSAGES

(71) Applicant: Grepr, Inc., San Francisco, CA (US)

(72) Inventor: Jad Naous, San Francisco, CA (US)

(73) Assignee: Grepr, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/810,915

(22) Filed: Aug. 21, 2024

Related U.S. Application Data

(63) Continuation of application No. 18/747,346, filed on Jun. 18, 2024.

(60) Provisional application No. 63/652,561, filed on May 28, 2024.

(51) Int. Cl.
| | |
|---|---|
| *G06F 16/00* | (2019.01) |
| *G06F 16/2455* | (2019.01) |
| *G06F 16/355* | (2025.01) |

(52) U.S. Cl.
CPC ...... *G06F 16/355* (2019.01); *G06F 16/24556* (2019.01)

(58) Field of Classification Search
CPC .......................... G06F 16/355; G06F 16/24556
USPC .......................................................... 707/739
See application file for complete search history.

(56) References Cited

U.S. PATENT DOCUMENTS

| | | |
|---|---|---|
| 10,691,728 B1 | 6/2020 | Masson et al. |
| 11,675,816 B1 | 6/2023 | Chandrasekharan et al. |
| 2013/0339473 A1 | 12/2013 | McCaffrey et al. |
| 2017/0116289 A1 | 4/2017 | Deshmukh et al. |
| 2018/0101607 A1 | 4/2018 | Yoon et al. |
| 2018/0102938 A1* | 4/2018 | Yoon ..................... G06F 16/358 |

OTHER PUBLICATIONS

Apache Flink, "Timely Stream Processing", available online at <https://nightlies.apache.org/flink/flink-docs-release-1.19/docs/concepts/time/>, retrieved from internet on Aug. 16, 2024, 5 pages.
Ayooluwa Isaiah, "How to Reduce Logging Costs with Log Sampling" available online at <https://betterstack.com/community/guides/logging/log-sampling/>, Jan. 5, 2024, 14 pages.

(Continued)

*Primary Examiner* — Chelcie L Daye
(74) *Attorney, Agent, or Firm* — Nicholson De Vos Webster & Elliott LLP

(57) ABSTRACT

A device may allocate a stream of log messages to nodes of an aggregator based on shared attributes of the log messages. A device may process, at each of the nodes, the log messages of the respective sub-stream as they are being received. The processing may include: determining, based on the timestamps of the log messages, a time window each of the log messages is within; and clustering, for each time window, the log messages within that time window based on the unstructured data of those log messages to form a set of clusters for that time window. A device may generate an aggregation for at least one of the set of clusters for that time window in response to deactivating each of the series of time windows for at least one of the nodes. A device may stream the aggregations to the user system in response to the generation.

30 Claims, 14 Drawing Sheets

(56) References Cited

OTHER PUBLICATIONS

Cribl, "The Data Engine for IT and Security", available online at <https://cribl.io/>, 2024, 13 pages.
Github, "A machine learning toolkit for log parsing [ICSE'19, DSN'16]", logpai /logparser, available online at <https://github.com/logpai/logparser>, Sep. 11, 2023, 5 pages.
He et al., "Drain: An Online Log Parsing Approach with Fixed Depth Tree", IEEE International Conference on Web Services (ICWS), 2017, 8 pages.
Renaud Boutet, "Log Patterns: Automatically cluster your logs for faster investigation", available online at <https://www.datadoghq.com/blog/log-patterns/>, Oct. 18, 2018, 12 pages.
Blackhurst, Gabby, "Take the Noise and Confusion Out of Your Monitoring Process with Patterns View", Article, Dec. 6, 2022, 3 pages, Edge Delta, Texas, USA, available online at https://edgedelta.com/company/blog/feature-patterns#:~:text=When%20issues%20occur%2C%20Edge%20Delta%E2%80%99s%20Patterns%20are%20here,new%20behaviors%20and%20solve%20problems%20as%20they%20appear.
Extended European Search Report, EP App. No. 25178652.1, Oct. 20, 2025, 11 pages.

\* cited by examiner

FIG. 12

AGGREGATING STREAMED NETWORK LOG MESSAGES

CROSS-REFERENCE TO RELATED APPLICATION

This application is a continuation of U.S. patent application Ser. No. 18/747,346 filed on Jun. 18, 2024, which claims the benefit of U.S. Provisional Patent Application No. 63/652,561 filed on May 28, 2024, which are incorporated by reference herein in its entirety.

TECHNICAL FIELD

One or more embodiments relate to the field of network assessment; and more specifically, to the assessment and aggregation of network log messages.

BACKGROUND ART

Log message aggregators can receive log messages from user systems relating to the network activity for those systems. For example, log message aggregators can receive log messages for user systems operating on the internet. In general, these log message aggregators can take the log messages for network activity and aggregate and/or summarize the log messages.

BRIEF DESCRIPTION OF THE DRAWINGS

The following figures use like reference numbers to refer to like elements. Although the following figures depict various example embodiments, alternative embodiments are within the spirit and scope of the appended claims. In the drawings:

FIG. 12 illustrates another exemplary graphical user interface for configuring a log message aggregator in accordance with some embodiments of the present disclosure.

DETAILED DESCRIPTION

The following description describes embodiments for, among other things, network log message aggregation using tokens. In this description, the figure(s) illustrating block diagrams sometimes refer to the figure(s) illustrating flow diagrams, and vice versa. Whether or not explicitly described, the alternative embodiments discussed with reference to the figure(s) illustrating block diagrams also apply to the embodiments discussed with reference to the figure(s) illustrating flow diagrams, and vice versa. At the same time, the scope of this description includes embodiments, other than those discussed with reference to the block diagrams, for performing the flow diagrams, and vice versa.

In some embodiments, a log message aggregator receives a stream of log messages from a user system and allocates the log messages to nodes of the aggregator based on attributes and/or structured data of the log messages. The log message aggregator can then generate aggregations at each of the nodes and send the generated aggregations to the users. By allocating the log messages before generating the aggregations, the log message aggregation system is able to operate in a distributed environment and provide log message aggregations with little latency. For example, because multiple computing nodes can be used and log messages allocated efficiently among them, the log message aggregator can be scaled up without a significant latency reduction.

This is advantageous over conventional systems. For example, stateless log-processing systems do not summarize or aggregate log messages. Log message sampling systems rely on randomness and can therefore fail to provide meaningful and/or critical log messages and/or provide unnecessary log messages. Log pattern mining systems aggregate log messages stored over longer periods of time and process them in batches to create the aggregations. These systems are not capable of running in real-time and providing up-to-date information on network activity. Additionally, these systems either sample small portions of log messages, providing incomplete data, or require a significant amount of investment and configuration to produce useful log messages. Furthermore, because log messages for network activity can differ so drastically, these systems with static configurations cannot provide accurate and meaningful summaries to all of their users and cannot change the summaries they provide at the request of the users.

Figure 1:
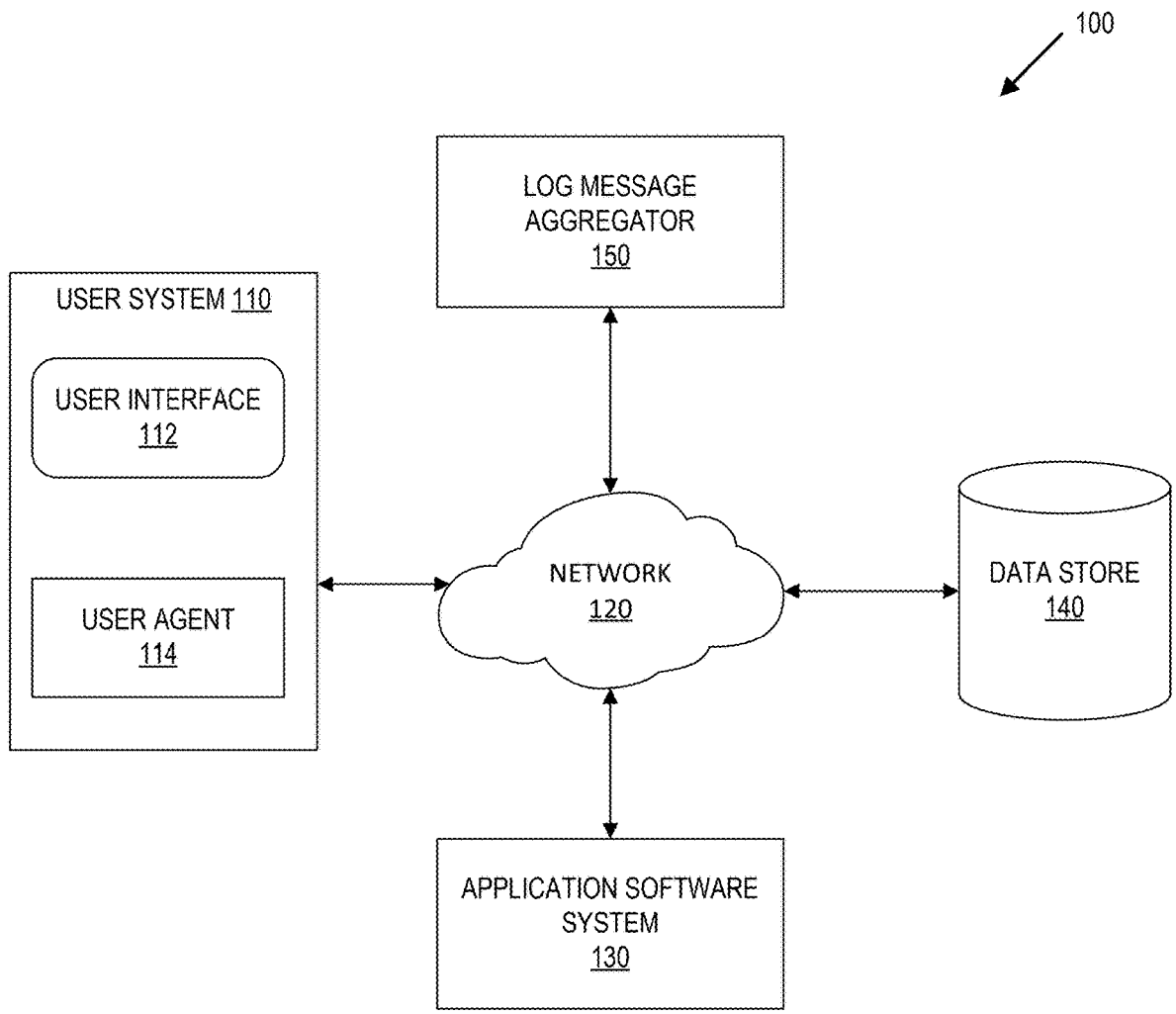
FIG. 1 illustrates an example computing system that includes a log message aggregator in accordance with some embodiments of the present disclosure.

FIG. 1 illustrates an example computing system 100 that includes a log message aggregator 150 in accordance with some embodiments of the present disclosure. In the embodiment of FIG. 1, computing system 100 includes a user system 110, a network 120, an application software system 130, a data store 140, and a log message aggregator 150. Each of these components of computing system 100 are described in more detail below.

User system 110 includes at least one computing device, such as a personal computing device, a server, a mobile computing device, or a smart appliance. User system 110 includes at least one software application, including a user interface 112 and/or user agent 114, installed on or accessible by a network to a computing device. For example, user interface 112 can be or include a front-end portion of application software system 130. User agent can be or include a back-end portion of application software system 130.

User interface 112 is any type of user interface as described herein. User interface 112 can be used to interact with a log message aggregation interface (such as graphical user interfaces 600, 700, 800, 900, 1000, 1100, and/or 1200) and view or otherwise perceive output that includes data produced by application software system 130. For example, user interface 112 can include a graphical user interface that includes a mechanism for configuring a log message aggregator and viewing log message aggregation results and/or other digital content. Examples of user interface 112 include web browsers, command line interfaces, and mobile apps. User interface 112 as used herein can include application programming interfaces (APIs).

Network 120 can be implemented on any medium or mechanism that provides for the exchange of data, signals, and/or instructions between the various components of computing system 100. Examples of network 120 include, without limitation, a Local Area Network (LAN), a Wide Area Network (WAN), an Ethernet network or the Internet, or at least one terrestrial, satellite or wireless link, or a combination of any number of different networks and/or communication links.

Application software system 130 is any type of application software system that includes or utilizes functionality and/or outputs provided by log message aggregator 150. Examples of application software system 130 include but are not limited to software such as but not limited to viewing log message aggregations, searching log messages, viewing network statistics, or any combination of any of the foregoing.

A client portion of application software system 130 can operate in user system 110, for example as a plugin or widget in a graphical user interface of a software application or as a web browser executing user interface 112. In an embodiment, a web browser can transmit an HTTP request over a network (e.g., the Internet) in response to user input that is received through a user interface provided by the web application and displayed through the web browser. A server running application software system 130 and/or a server portion of application software system 130 can receive the input, perform at least one operation using the input, and return output using an HTTP response that the web browser receives and processes. In some embodiments, user system 110 and application software system 130 can communicate using protocols other than HTTP.

Data store 140 can include any combination of different types of memory devices. Data store 140 stores digital data used by user system 110, application software system 130, and/or log message aggregator 150. Data store 140 can reside on at least one persistent and/or volatile storage device that can reside within the same local network as at least one other device of computing system 100 and/or in a network that is remote relative to at least one other device of computing system 100. Thus, although depicted as being included in computing system 100, portions of data store 140 can be part of computing system 100 or accessed by computing system 100 over a network, such as network 120.

Each of user system 110, application software system 130, data store 140, and log message aggregator 150 is implemented using at least one computing device that is communicatively coupled to electronic communications network 120. Any of user system 110, application software system 130, data store 140, and log message aggregator 150 can be bidirectionally communicatively coupled by network 120. User system 110 as well as one or more different user systems (not shown) can be bidirectionally communicatively coupled to application software system 130. Examples of communicative coupling mechanisms include network interfaces and application program interfaces (APIs).

A typical user of user system 110 can be an administrator or end user of application software system 130, and/or log message aggregator 150. User system 110 is configured to communicate bidirectionally with any of application software system 130, data store 140, and/or log message aggregator 150 over network 120.

The features and functionality of user system 110, application software system 130, data store 140, and log message aggregator 150 are implemented using computer software, hardware, or software and hardware, and can include combinations of automated functionality, data structures, and digital data, which are represented schematically in the figures. User system 110, application software system 130, data store 140, and log message aggregator 150 are shown as separate elements in FIG. 1 for ease of discussion but the illustration is not meant to imply that separation of these elements is required. The illustrated systems, services, and data stores (or their functionality) can be divided over any number of physical systems, including a single physical computer system, and can communicate with each other in any appropriate manner.

The log message aggregator 150 generates log message aggregations using tokens. Further details with regard to the operations of log message aggregator 150 are described below.

Figure 2:
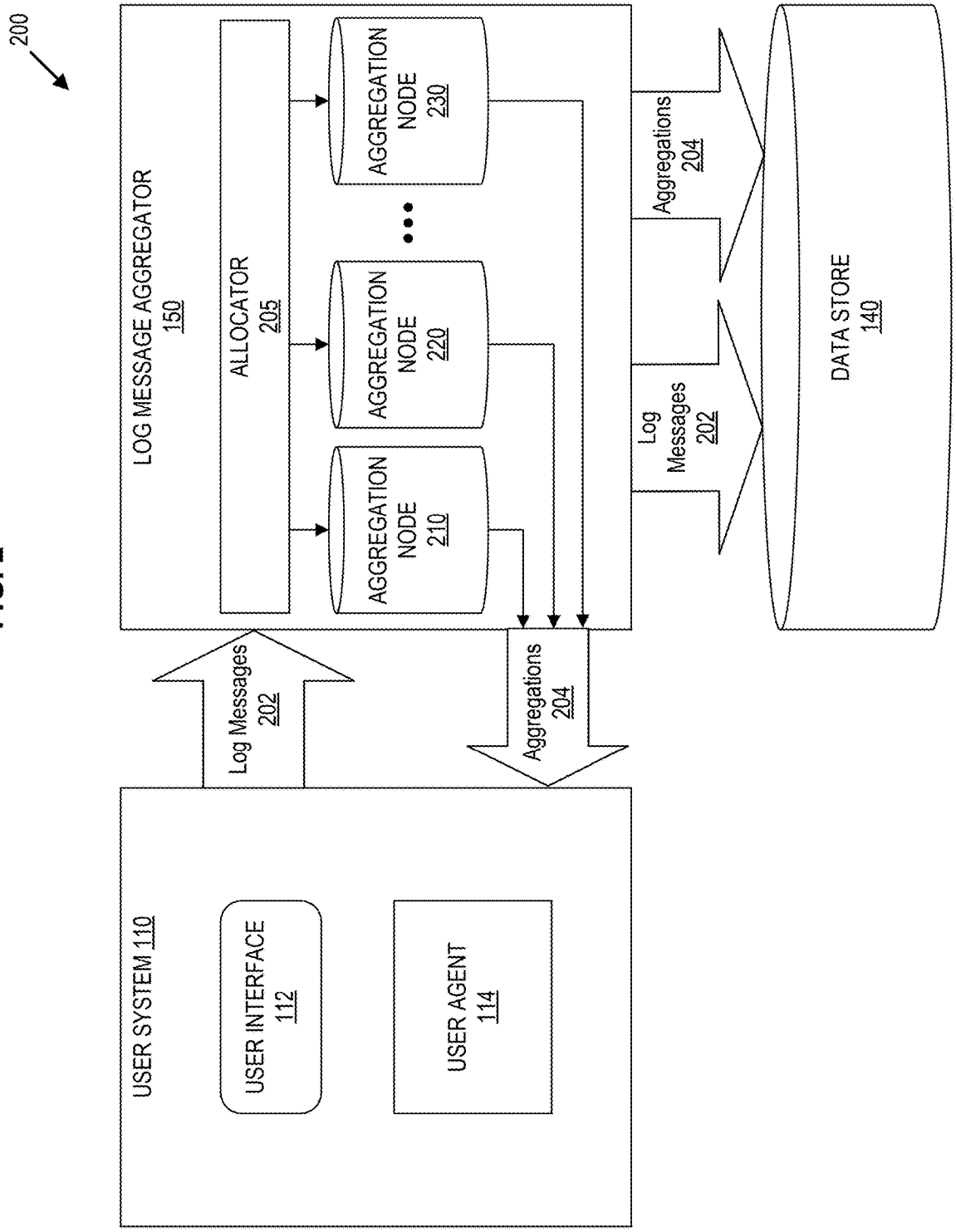
FIG. 2 illustrates another example computing system that includes a log message aggregator in accordance with some embodiments of the present disclosure.

FIG. 2 illustrates another example computing system that includes a log message aggregator 150 in accordance with some embodiments of the present disclosure. As shown in FIG. 2, computing system 200 includes user system 110, log message aggregator 150, and data store 140. Log message aggregator 150 includes allocator 205 and aggregation nodes 210, 220, and 230.

In some embodiments, log message aggregator 150 receives log messages 202 from user system 110. For example, log messages 202 are messages about the network activity of user system 110 and user system 110 streams log messages 202 to log message aggregator 150. In some embodiments, log messages 202 include unstructured text regarding network activity of user system 110 (e.g., unstructured data 316, 326, and 336 of FIG. 3). In some embodiments, log messages 202 also include structured data (e.g., structured data 314, 324, and 334 of FIG. 3). For example, log messages 202 can include unstructured text about a network event for user system 110 and can also include associated structured data such as tags including the host name for a host associated with the network event, internet protocol (IP) addresses of devices associated with the network event, a user of user system 110 associated with the network event, an application process associated with the network event, files associated with the network event, and/or combinations of these. Further details regarding log messages 202 are described with reference to FIG. 3.

In some embodiments, user system 110 streams log messages 202 to log message aggregator 150. For example, user system 110 stream log messages 202 in real-time to log message aggregator. As used herein, real-time refers to operations that occur with little to no delay in time. For example, rather than accumulating log messages and sending them in batches, user system 110 sends log messages 202 as they occur. In some embodiments, described in further detail below, log message aggregator aggregates log messages using windows of time rather than aggregating the batches. It will be appreciated by those of ordinary skill in the art, however, that not every log message can be created and sent in the same timeframe. For example, user system 110 may be able to send one log message of log messages 202 immediately while it may take more time to process and send another log message of log messages 202. Accordingly, user system 110 sends the stream of log messages 202 in an order that is not necessarily chronological for the actual time of occurrence of the network events. As described herein, the event time for a network event refers to the actual time that the network event occurred and/or was detected. For example, the event time for a log message of log messages 202 is a timestamp (e.g., timestamps 312, 322, and 332) recorded by user system 110 and included in log messages 202. In contrast, as described herein, the processing time for a network event refers to the time that the log message associated with that network event was sent and/or received by the relevant component of computing system 200. For example, the processing time for a log message of log messages 202 is a time at which the log message was sent by user system 110 and/or a time at which the log message was received by log message aggregator 150.

As shown in FIG. 2, log message aggregator 150 receives the stream of log messages 202 and allocates log messages of the stream to aggregation nodes 210, 220, and 230. For example, allocator 205 allocates log messages of the stream of log messages 202 to aggregation nodes 210, 220, and 230 of log message aggregator 150. The allocator 205 may perform the allocation based on unstructured data and/or structured data within the log messages 202. For instance, in some embodiments, allocator 205 allocates the log messages based on attributes of the log messages. For example, the attributes for a log message of log messages 202 can be based on the unstructured data of that log message. Some examples of attributes include token length (e.g., how many tokens are in the unstructured data of a log message) and token shape (e.g., the number/type of characters that make up a given token). In some embodiments, allocator 205 allocates the log messages 202 based on structured data of the log messages. For example, allocator 205 allocates log messages 202 based on structured data included in each of the log messages such as a severity of the log message, a host associated with the log message, a service associated with the log message, or a processing duration of a request associated with the log message (e.g., a processing duration of an HTTP request with which the log message is concerned). Further details regarding attributes and structured data of the log messages are discussed with reference to FIG. 3.

Each of aggregation nodes 210, 220, and 230 is thus allocated a sub-stream of log messages 202. Although illustrated as including three aggregation nodes (e.g., aggregation nodes 210, 220, and 230), log message aggregator 150 can include two or more aggregation nodes. While FIG. 2 illustrates a single level of aggregation nodes, some embodiments include multiple levels of aggregation nodes. For example, log message aggregator 150 can implement a multi-level aggregation technique as described in further detail with reference to FIG. 5.

Each of aggregation nodes 210, 220, and 230 receives one or more sub-streams of log messages 202 and processes the log messages in its respective sub-streams to generate aggregations 204 for those log messages. For example, each of aggregation nodes 210, 220, and 230 can generate an aggregator state for each sub-stream received by that aggregation node for multiple event time windows. An event time window is a time window that spans a range of event times (e.g., timestamps). Aggregation nodes 210, 220, and 230 cluster log messages for each sub-stream and each time window using the unstructured data of the log messages (e.g., tokens). Aggregation nodes 210, 220, and 230 can determine when an event time window is closed and apply an aggregation function to the clustered log messages for that event time window.

In some embodiments, aggregation nodes 210, 220, and 230 apply the aggregation function in response to a trigger. For example, aggregation nodes 210, 220, and 230 can apply the aggregation function based on a processing time window trigger and/or a watermark timestamp trigger. Further details regarding clustering, applying the aggregation function, and the trigger are discussed with reference to FIGS. 3 and 4.

Aggregations generated by log message aggregator 150 are sent, directly or indirectly to the user system 110. In embodiments as illustrated in FIG. 2 where there is one level of aggregators, these are aggregations generated by aggregation nodes 210, 220, and 230; while in embodiments with multiple levels of aggregators, it will typically be the aggregations generated by the last level of aggregators. For example, in some embodiments, log message aggregator 150 streams aggregations 204 directly to user system 110 as they are created by each of aggregation nodes 210, 220, and 230. Additionally or alternatively, log message aggregator 150 stores these aggregations in data store 140. In some embodiments, although not illustrated, user system 110 receives aggregations 204 from data store 140. For example, in response to a user of user system 110 interacting with user interface 112 to request aggregations 204, an application software system (e.g., application software system 130 of FIG. 1) retrieves aggregations 204 from data store 140.

Figure 3:
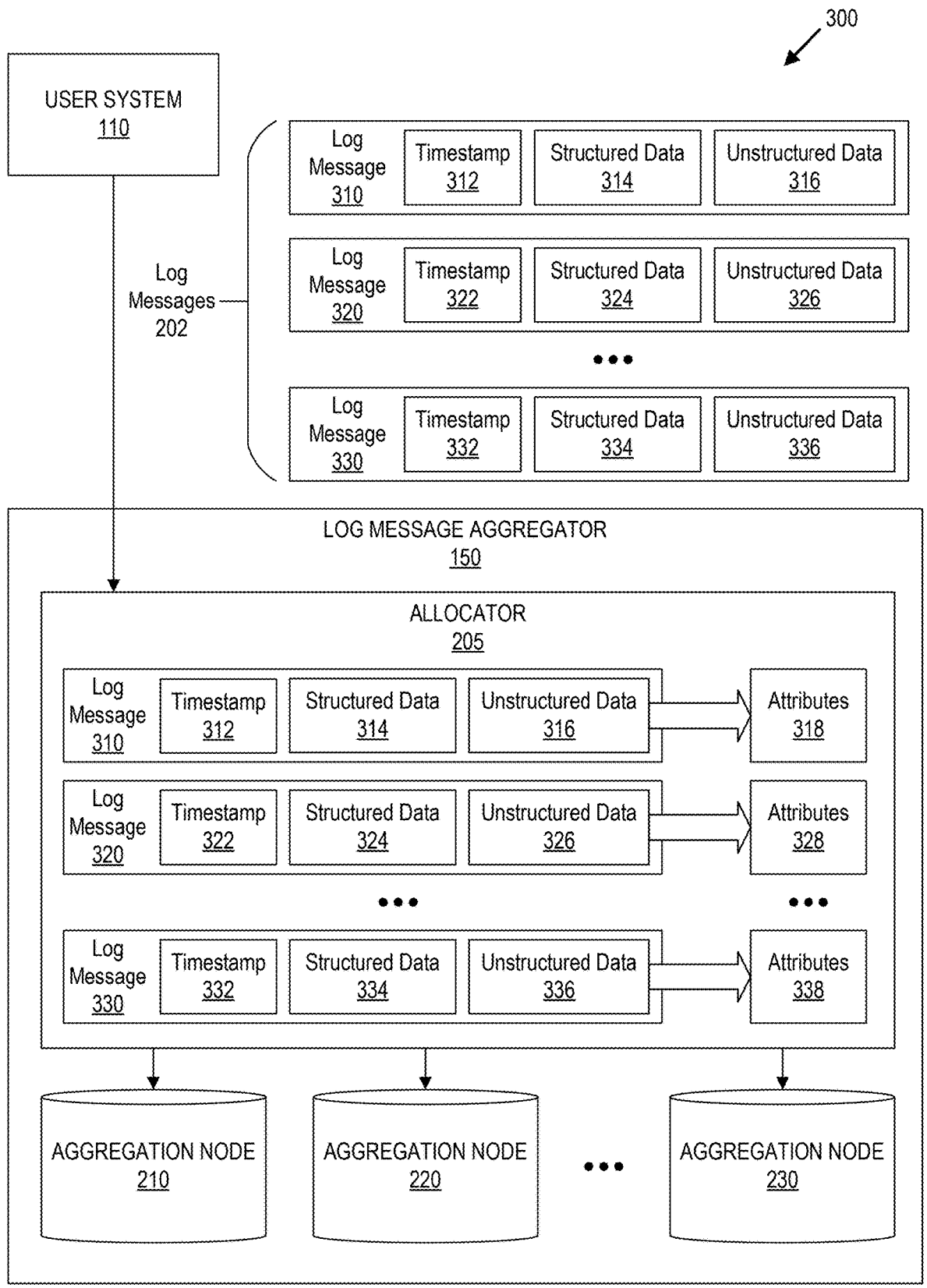
FIG. 3 illustrates another example computing system that includes a log message aggregator in accordance with some embodiments of the present disclosure.

FIG. 3 illustrates another example computing system 300 that includes a log message aggregator 150 in accordance with some embodiments of the present disclosure. As shown in FIG. 3, user system 110 sends log messages 202 to log message aggregator 150. For example, user system 110 streams log messages 202 and log message aggregator 150 receives log messages 202 as a stream of log messages. Each of the log messages in the stream of log messages 202 includes a timestamp and unstructured data (e.g., tokens). In some embodiments, one or more of the log messages in the stream of log messages 202 also includes structured data. For example, log message 310 includes timestamp 312, structured data 314, and unstructured data 316. Similarly, log message 320 includes timestamp 322, structured data 324, and unstructured data 326, and log message 330 includes timestamp 332, structured data 334, and unstructured data 336. Although illustrated as including three log messages, log messages 202 may and typically do include more log messages.

Unstructured data 316, 326, and 336 includes the unstructured portion of a log message for a network event. In one example, unstructured data 316 includes the following text: "Submitting summation job 2351 to 192.168.0.1:3245." In contrast, structured data 314 includes additional data sent along with the log. For example, structured data 314 includes information relating to the severity of log message 310, the host for log message 310, the service for log message 310, a processing duration of a request associated with log message 310 (e.g., the processing duration of an HTTP request with which log message 310 is concerned), the number of bytes included in a payload associated with log message 310 (e.g., the number of bytes in the payload of an HTTP response to which log message 310 corresponds), etc. In some embodiments, the elements of unstructured data are broken down into tokens. For example, each of the words, spacing, punctuation, and numbers in the text of unstructured data for a log message can be its own token.

In some embodiments, log message aggregator 150 determines attributes 318, 328, and 338 for each of log messages 310, 320, and 330 using the respective unstructured data 316, 326, and 336. For example, log message aggregator 150 determines attributes 318 including a token count for log message 310 by counting the number of tokens included in unstructured data 316.

Allocator 205 allocates one or more sub-streams of log messages 202 to each of aggregation nodes 210, 220, and 230 based on at least one of the attributes for the log messages and/or the structured data for the log messages. For example, allocator 205 may allocate all log messages of log messages 202 with a token length of eleven to aggregation node 210 and allocate all log messages of log messages 202 with a token length of seven to aggregation node 220. As an alternative example, allocator 205 allocates all log messages of log messages 202 associated with a first host to aggregation node 210 and allocates all log messages of log messages 202 associated with a second host to aggregation node 220. As yet another example, allocator 205 allocates based on a combination of attributes, such as those with token length of seven and associated with the first host get allocated to aggregation node 210.

Figure 10:
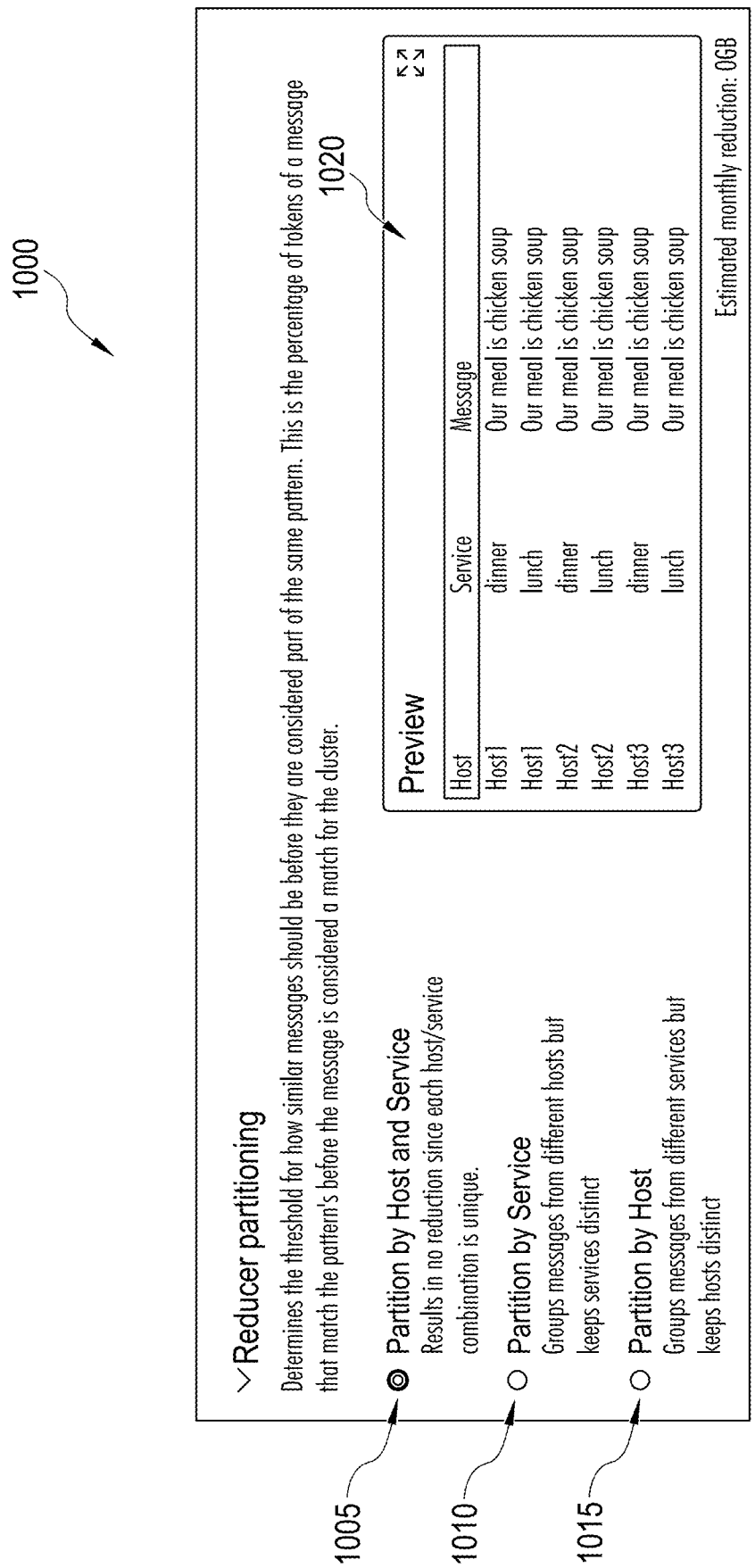
FIG. 10 illustrates an exemplary graphical user interface for configuring a log message aggregator in accordance with some embodiments of the present disclosure.

In some embodiments, allocator 205 allocates the one or more sub-streams of log messages 202 to aggregation nodes 210, 220, and 230 based on a partition identifier (e.g., partition identifiers 1005, 1010, and/or 1015 of FIG. 10). For example, in response to a user of user system 110 interacting with a user interface (e.g., user interface 112 of FIG. 1) of user system 110, user system 110 sends a partition identifier to log message aggregator 150 to partition log messages 202 based on the associated service. Accordingly, allocator 205 allocates all log messages of log messages 202 associated with a first service to aggregation node 210 and allocates all log messages of log messages 202 associated with a second service to aggregation node 220. In some embodiments, allocator 205 uses a combination of partition identifiers and one or more of the attributes to perform allocations.

Figure 4:
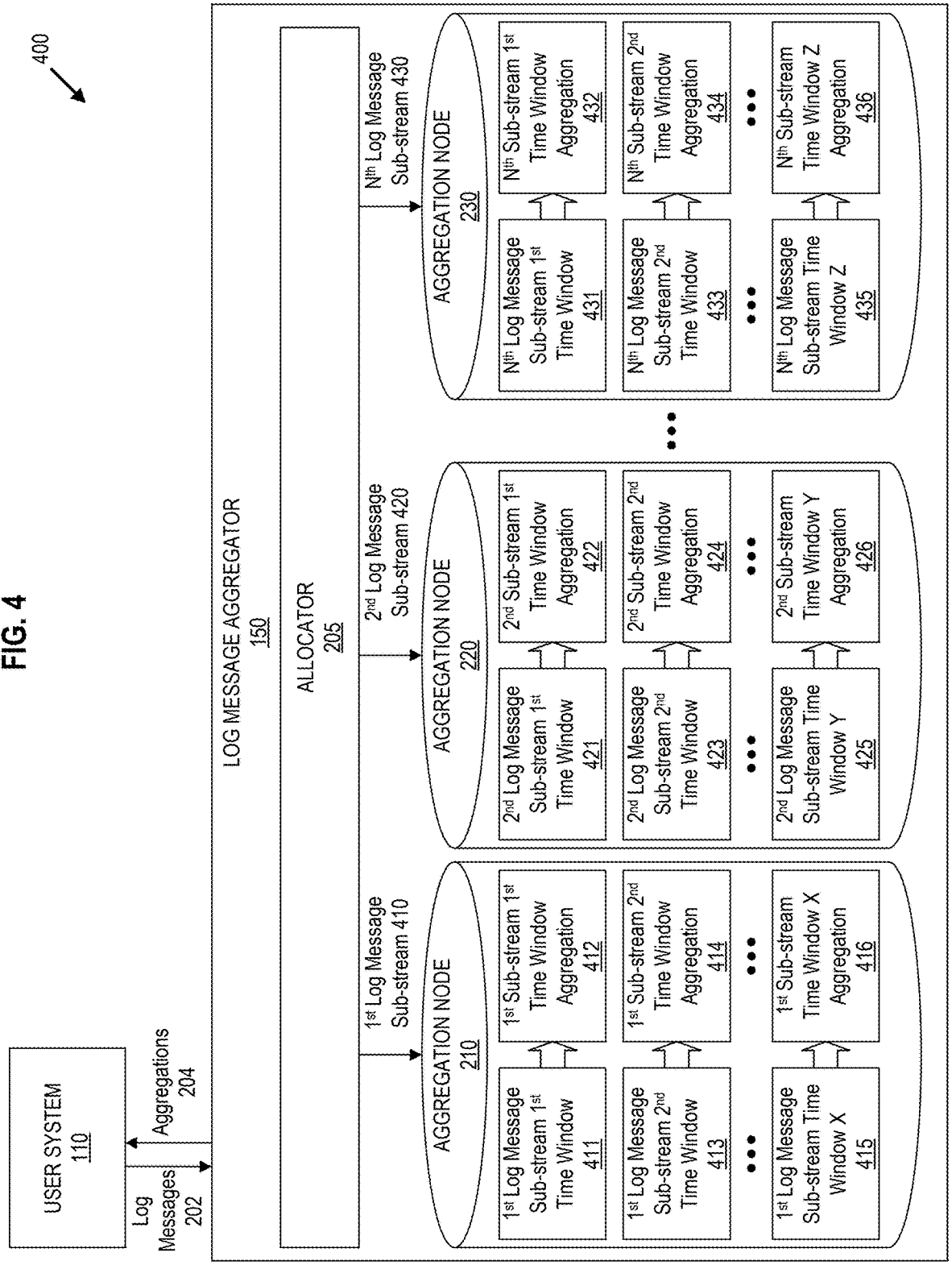
FIG. 4 illustrates another example computing system that includes a log message aggregator in accordance with some embodiments of the present disclosure.

FIG. 4 illustrates another example computing system 400 that includes a log message aggregator 150 in accordance with some embodiments of the present disclosure. Like FIG. 3, FIG. 4 shows user system 110, log messages 202, log message aggregator 150, and aggregations 204.

As shown in FIG. 4, allocator 205 sends $1^{st}$ log message sub-stream 410 to aggregation node 210, $2^{nd}$ log message sub-stream 420 to aggregation node 220, and $N^{th}$ log message sub-stream 430 to aggregation node 230. As explained with reference to FIG. 2, each of aggregation nodes 210, 220, and 230 can receive multiple sub-streams and maintain an aggregator state for each event time window and each sub-stream. In the example shown in FIG. 4, aggregation node 210 maintains an aggregation state for each of X time windows for $1^{st}$ log message sub-stream 410. For example, aggregation node 210, based on those log messages of the $1^{st}$ log message sub-stream 410 that belong to a $1^{st}$ time window ($1^{st}$ log message sub-stream $1^{st}$ time window 411), maintains an aggregation state ($1^{st}$ sub-stream $1^{st}$ time window aggregation 412) which includes information about the clusters for log messages of $1^{st}$ log message sub-stream 410 with timestamps that fall within the $1^{st}$ time window. Similarly, aggregation node 210 also maintains, for other time windows (e.g., based on those log messages of the $1^{st}$ log message sub-stream 410 that belong to respective ones of a $2^{nd}$ through time window X ($1^{st}$ log message sub-stream $2^{nd}$ time window 413 through $1^{st}$ log message sub-stream time window X 415), other aggregations (e.g., $1^{st}$ log message sub-stream $2^{nd}$ time window aggregation 414 through $1^{st}$ log message sub-stream time window aggregation X 416).

In some embodiments, each of aggregation nodes 210, 220, and 230, for their respective sub-streams, determines a time window to which each log message belongs. For example, as aggregation node 210 receives a log message in $1^{st}$ log message sub-stream 410, aggregation nodes 210 determines the timestamp for the log message and adds it to one of $1^{st}$ log message sub-stream $1^{st}$ time window 411, $2^{nd}$ time window 413, or time window X 415 based on the timestamp.

In some embodiments, each of aggregation nodes 210, 220, and 230 cluster log messages in each of the aggregation states using tokens of the unstructured data for the log messages. For example, as each of the aggregation nodes 210, 220, and 230 receive messages for a given sub-stream in a given time window, aggregation node 210 builds patterns for the received log messages and tracks the number of log messages received for each pattern.

In some embodiments, each of the tokens has a token type. For example, the token types can include literals, masks, punctuation, and wildcards. Literals refers to actual words that remain the same across different messages (e.g., "Submitting"). Masks refer to values that are known to likely change from message to message (e.g., "09:35:00.231Z"). Punctuation refers to punctuation, spacing, and other aspects of the unstructured text that indicate separation between other tokens (e.g., ":"). Wildcards refer to values that may change from message to message but are not necessarily known to change a priori (e.g., "RUNNING").

In some embodiments, when the number of received log messages for a certain patterns satisfies an aggregation threshold, log message aggregator 150 will stop forwarding the log messages for that pattern to user system 110. For instance, when aggregation node 210 has determined that the number of received log messages for a given pattern satisfies the aggregation threshold, aggregation node 210 collects the values for parameters for those log messages. For example, the parameters include values that differ between log messages in the same pattern. In some embodiments, the parameters can include mask tokens and/or wildcard tokens. Aggregation node 210 generates aggregations using the pattern and the collected values. For example, aggregation node 210 can generate $1^{st}$ sub-stream $1^{st}$ time window aggregation 412 using the patterns and parameter values from $1^{st}$ log message sub-stream $1^{st}$ time window 411. Similarly, aggregation node 210 can generate $1^{st}$ sub-stream $2^{nd}$ time window aggregation 414 using the patterns and parameter values from $1^{st}$ log message sub-stream $2^{nd}$ time window 413 and generate $1^{st}$ sub-stream time window X aggregation 416 using the patterns and parameter values from $1^{st}$ log message sub-stream time window X 415.

Aggregation node 220 can generate $2^{nd}$ sub-stream $1^{st}$ time window aggregation 422, $2^{nd}$ sub-stream $2^{nd}$ time window aggregation 424, and $2^{nd}$ sub-stream time window Y aggregation 426 using the patterns and parameter values from $2^{nd}$ sub-stream $1^{st}$ time window 421, $2^{nd}$ sub-stream $2^{nd}$ time window 423, and $2^{nd}$ sub-stream time window Y 425 respectively. Aggregation node 230 can generate $N^{th}$ sub-stream $1^{st}$ time window aggregation 432, $N^{th}$ sub-stream $2^{nd}$ time window aggregation 434, and $N^{th}$ sub-stream time window Z aggregation 436 using the patterns and parameter values from $N^{th}$ sub-stream $1^{st}$ time window 431, $N^{th}$ sub-stream $2^{nd}$ time window 433, and $N^{th}$ sub-stream time window Z 435 respectively.

In some embodiments, the aggregation nodes collect parameters based on a parameter example number. For example, in response to a user interacting with a user interface of user system 110, user system 110 sends a parameter example number to log message aggregator 150 indicating the number of unique values of a parameters to store.

In some embodiments, each of aggregation nodes 210, 220, and 230 generate clusters using similarity scores for the log messages. For example, aggregation node 210 can calculate a similarity score for the current log messages with each cluster already in the aggregation and assign the log message to the cluster with the highest similarity score. In some embodiments, aggregation node 210 only assigns a log message to a cluster if the similarity score satisfies a similarity threshold. In such embodiments, if the similarity score does not satisfy the similarity threshold, aggregation node 210 can start a new cluster for the log message. In some embodiments, aggregation node 210 determines a subset of clusters. For example, aggregation node 210 only calculates similarity scores for clusters that have the same first few tokens as the current message. In some embodiments, aggregation nodes 210 masks any values that have a high likelihood of being parameters (e.g., numbers) before determining the subset of clusters and/or calculating the similarity score.

In some embodiments, each of aggregation nodes 210, 220, and 230 converts mismatched tokens for a log message to wildcards when assigned to a cluster. For example, aggregation node 210 assigns a current log message to a cluster and any tokens in that log message that do not match the pattern of the cluster are converted into wildcards (e.g., parameters). In some embodiments, aggregation node 210 stores the values for these wildcards. In other embodiments, aggregation node 210 only stores example values for a subset of the log messages included in the pattern. For example, aggregation node 210 stores the minimum, average, and maximum value for a number.

As mentioned earlier, each of the log messages includes punctuation as tokens. Accordingly, each of aggregation nodes 210, 220, and 230 use the punctuation tokens (e.g., punctuation and spacing) when calculating the similarity score. Conventional systems that do not use punctuation as tokens can aggregate log messages with other tokens that are similar even though the punctuation makes the overall log message very different. By including punctuation as tokens, the system has improved clustering and matching for log messages with fewer false positives as punctuation is usually the same across log messages that belong to the same pattern.

In some embodiments, log message aggregator 150 forwards a few log messages of each pattern to user system 110 before aggregating the log messages and sending summaries. For example, log message aggregator 150 forwards log messages for patterns that do not satisfy the aggregation threshold to user system 110. Accordingly, computing system 400 can send low-frequency messages with little processing latency.

In some embodiments, aggregation nodes 210, 220, and/or 230 generate aggregations in response to a trigger. For example, aggregation nodes 210, 220, and/or 230 assign a processing time to a cluster when a new cluster is created. For example, in response to creating a new cluster of log messages (e.g., determining that the number of log messages in a cluster satisfies the aggregation threshold), aggregation node 210 sets a processing time based on the time the new cluster was created. In such an example, aggregation node 210 generates the aggregations in response to determining that a current time is greater than the processing time for that cluster by a threshold amount. For example, aggregation nodes 210, 220, and/or 230 generate aggregations for a cluster when the following equation is satisfied. CurrentTime−ProcessingTime>EventTimeWindow.

Figure 5:
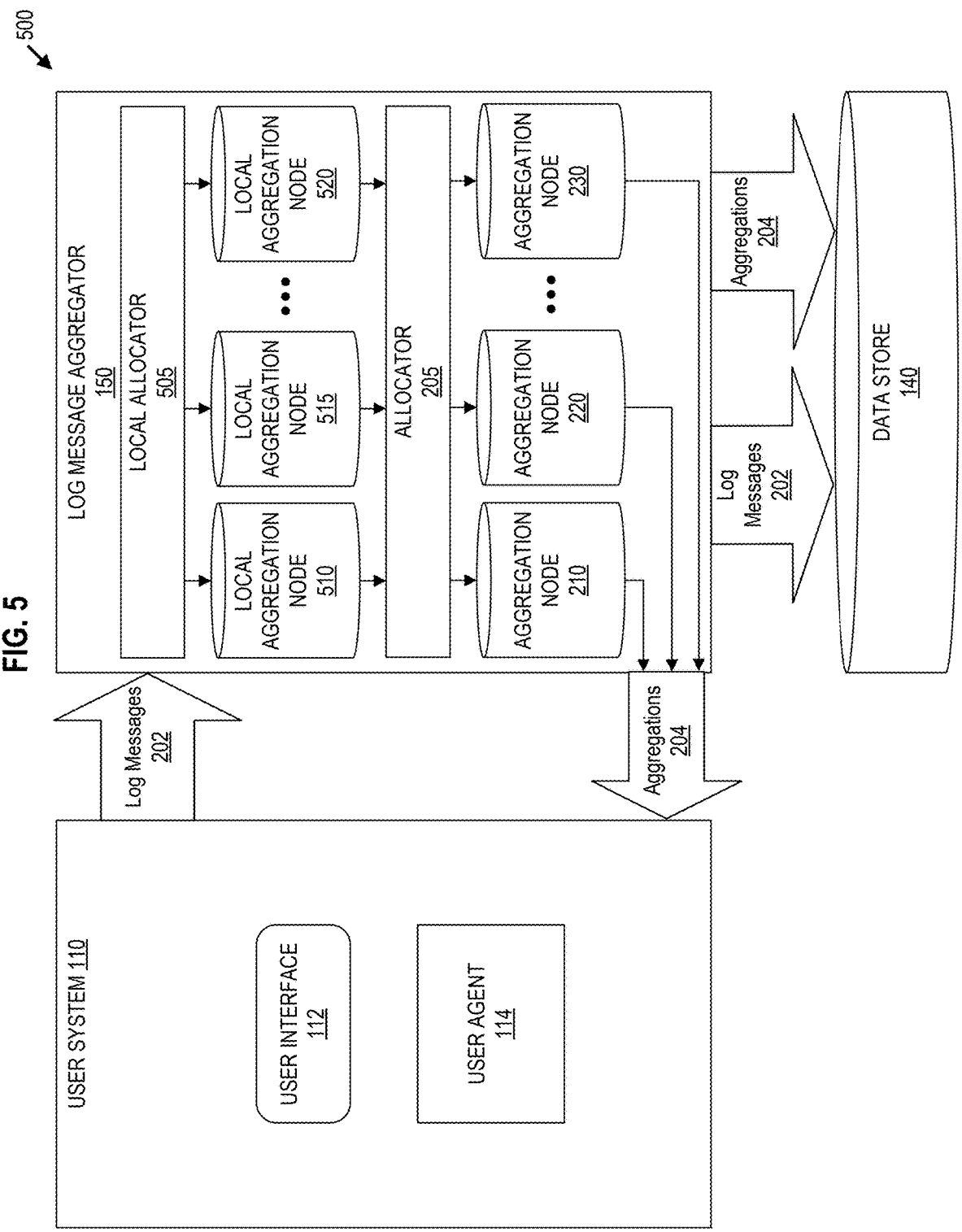
FIG. 5 illustrates another example computing system that includes a log message aggregator.

In some embodiments, log message aggregator 150 determines a watermark timestamp based on the event times associated with log messages of log messages 310 that have already been processed. For example, log message aggregator 150 determines the watermark timestamp as the minimum value of the event times associated with the processed log messages. In some embodiments, log message aggregator 150 determines the watermark timestamp as the minimum value of the event times associated with processed log messages from multiple sources. For example, log message aggregator 150 receives log messages 310 from different sources that vary in event time (e.g., log message aggregator 150 receives at a current processing time, log messages from each source with different event times) and determines a watermark timestamp as the minimum value of the event time for all of the sources. In some embodiments, log message aggregator 150 determines the watermark timestamp as the minimum value minus a threshold value to account for errors (e.g., errors in event timestamps). In some embodiments, log message aggregator 150 recalculates the watermark timestamp. For example, log message aggregator 150 recalculates the watermark timestamp after a threshold amount of time. In some embodiments, log message aggregator 150 determines the watermark timestamp based on known delays and/or time differences between originators of the log messages. In such embodiments, log message aggregator 150 generates aggregations based on the watermark timestamp and a time window (e.g., event time window). For example, aggregation nodes 210, 220, and/or 230 generate aggregations for a cluster when the watermark timestamp passes the end of the event time window for that cluster and/or set of clusters. FIG. 5 illustrates another example computing system 500 that includes a log message aggregator 150 in accordance with some embodiments of the present disclosure. As shown in FIG. 5, computing system 500 includes user system 110, log message aggregator 150, and data store 140. Log message aggregator 150 includes local allocator 505, local aggregation nodes 510, 515, and 520, allocator 205, and allocation nodes 210, 220, and 230. FIG. 5 illustrates a multi-level aggregator with at least two levels of aggregation.

As shown in FIG. 5, log message aggregator 150 receives log messages 202 and local allocator 505 allocates them to parallel local aggregation nodes 510, 515, and 520. Local aggregation nodes 510, 515, and/or 520 implement a local aggregation like aggregations nodes 210, 220, and 230 discussed with reference to FIG. 5. In some embodiments, the time windows for local aggregation nodes 510, 515, and 520 are shorter than the time windows for aggregation nodes 210, 220, and 230. Local aggregation nodes 510, 515, and 520 send the generated local aggregations to allocator 205. Allocator 205 allocates the local aggregations to aggregation nodes 210, 220, and 230 as discussed with reference to FIGS. 2 and 3.

Figure 6:
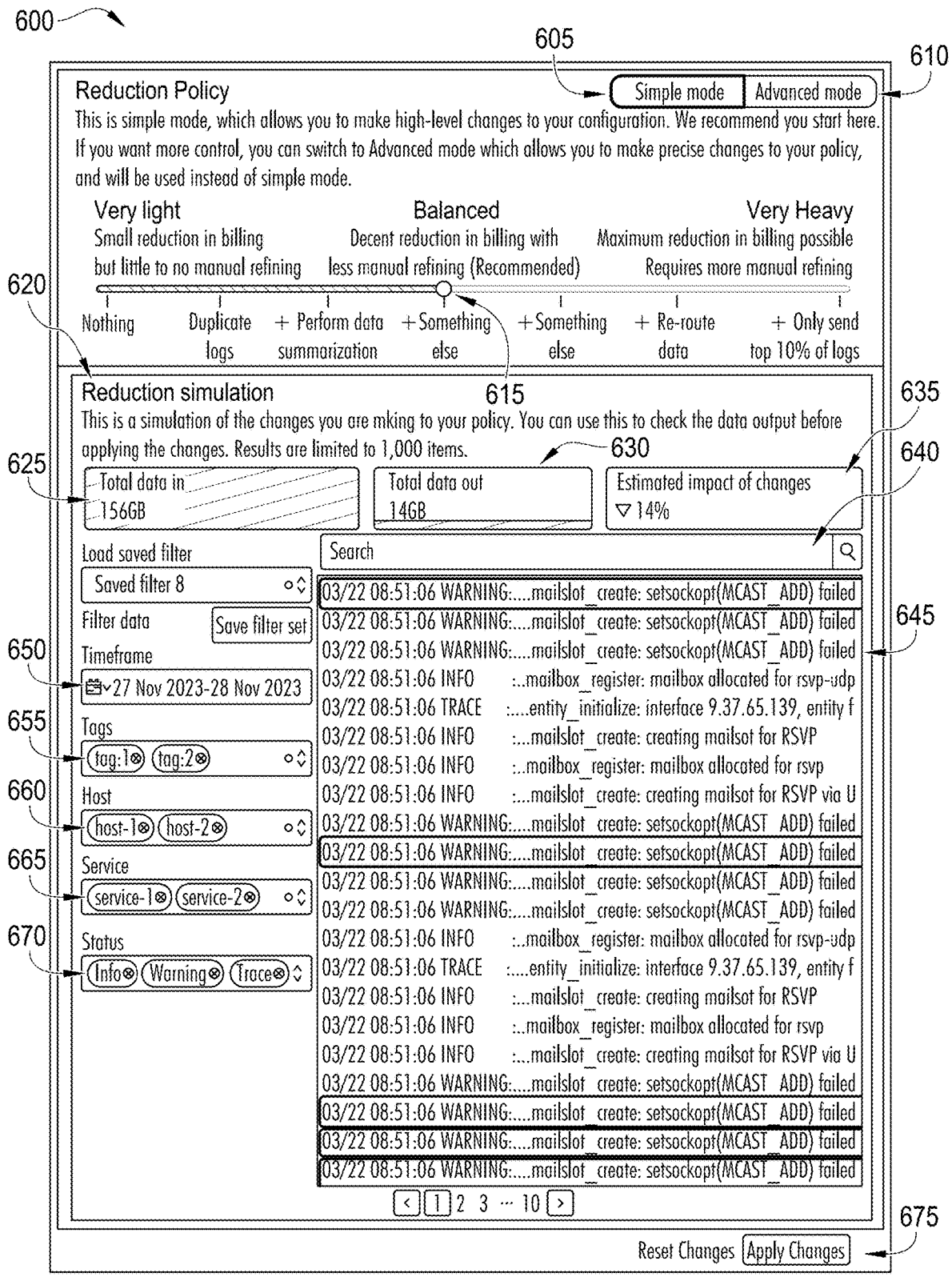
FIG. 6 illustrates an exemplary graphical user interface for configuring a log message aggregator in accordance with some embodiments of the present disclosure.

FIG. 6 illustrates an exemplary graphical user interface 600 for configuring a log message aggregator 150 in accordance with some embodiments of the present disclosure. Graphical user interface 600 includes simple mode button 605, advanced mode button 610, reduction policy slider 615, reduction simulation interface 620, input data size 625, output data size 630, estimated impact 635, search bar 640, reduction policy log interface 645, timeframe filter 650, tag filter 655, host filter 660, service filter 665, status filter 670, and apply changes button 675. Graphical user interface 600 can be the graphical user interface of a user system (e.g., user interface 112 of user system 110 of FIG. 1). In response to a user interacting with graphical user interface 600, the associated user system 110 can communicate with a log message aggregator (e.g., log message aggregator 150 of FIGS. 1-5). For example, in response to a user selecting the simple mode button 605, the user interface displays graphical user interface 600.

Reduction policy slider 615 is an interactive slider that allows a user of graphical user interface 600 to select between multiple options (e.g., nothing, perform data summarization, only send top 10% of logs). In response to a user interacting with reduction policy slider 615, reduction simulation interface 620 updates to show the simulated results of the selected policy. In response to a user interacting with apply changes button 675, the user system associated with graphical user interface 600 sends the log message aggregator configuration parameters associated with the selected reduction policy to a log message aggregators (e.g., log message aggregator 150 of FIGS. 1-5).

As shown in FIG. 6, input data size 625, output data size 630, and estimated impact 635 illustrate the estimated data metrics for a computing system (e.g., computing systems 100, 200, 300, 400, and/or 500) implementing the changes selected by the user interacting with graphical user interface 600 (e.g., reduction policy slider 615). For example, input data size 625 indicates the size of log messages received by the log message aggregator (e.g., log message aggregator 150 of FIGS. 1-5), output data size 630 indicates the size of log messages sent by the log message aggregator to the user system (e.g., user system 110 of FIGS. 1-5), and estimated impact 635 indicates the change in the total data out size as a result of the currently selected changes (e.g., reduction policy slider 615). Search bar 640 is a search bar for receiving user input. For example, in response to a user of graphical user interface 600 selecting search bar 640 and inputting text, reduction policy log interface 645 updates to display log messages including the input text.

Timeframe filter 650, tag filter 655, host filter 660, service filter 665, and status filter 670 are filters that affect which log messages are displayed in reduction policy log interface 645. In response to a user interacting with any of timeframe filter 650, tag filter 655, host filter 660, service filter 665, status filter 670, reduction policy log interface 645 updates to display log messages that fit the appropriate filters. In some embodiments, in response to a user interacting with advanced mode button 610, the graphical user interface updates to graphical user interface 700.

Figure 7:
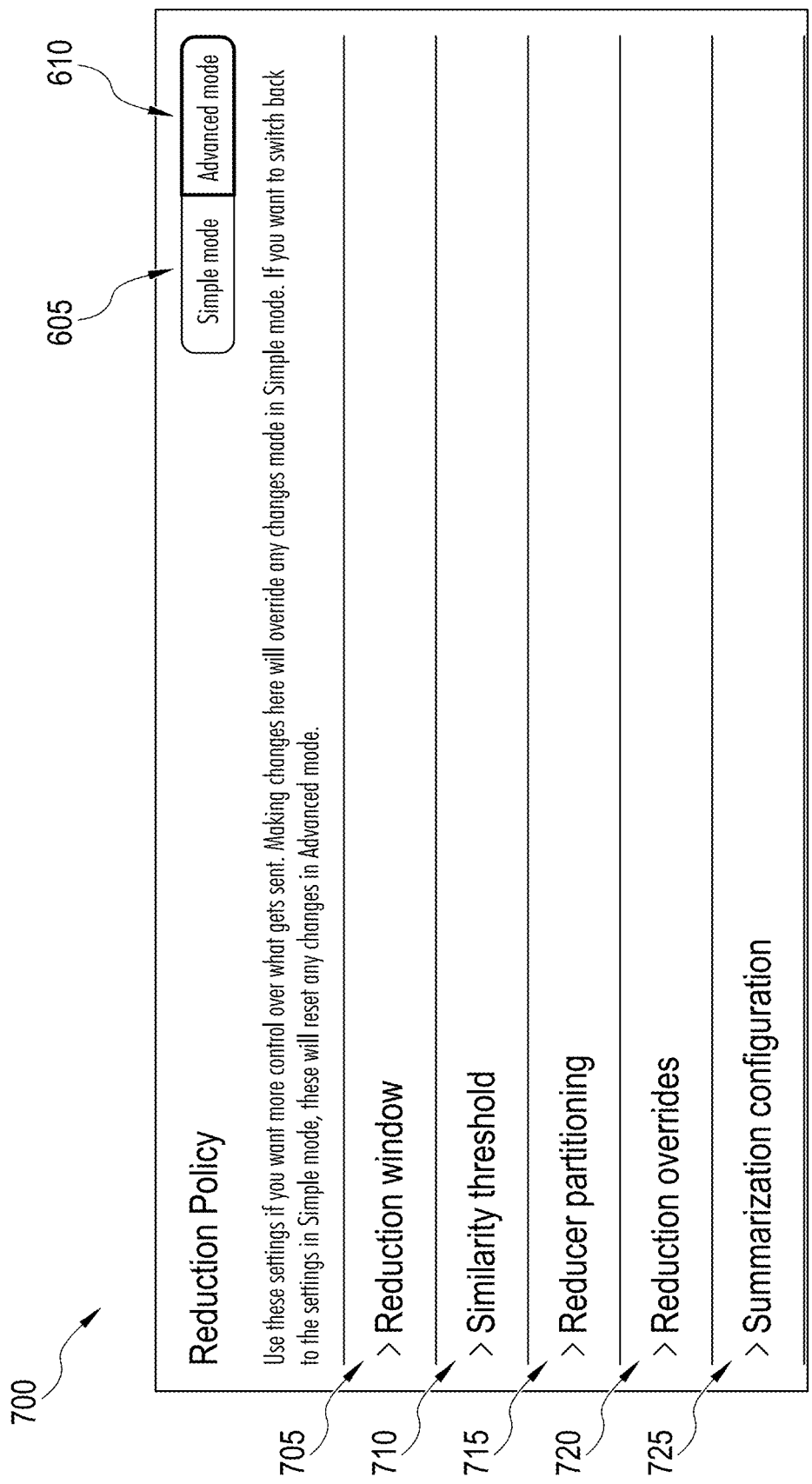
FIG. 7 illustrates another exemplary graphical user interface for configuring a log message aggregator in accordance with some embodiments of the present disclosure.

FIG. 7 illustrates another exemplary graphical user interface 700 for configuring a log message aggregator in accordance with some embodiments of the present disclosure. Graphical user interface 700 include simple mode button 605 and advanced mode button 610, reduction window interface 705, similarity threshold interface 710, reducer partitioning interface 715, reduction overrides interface 720, and summarization configuration interface 725. Graphical user interface 700 can be the graphical user interface of a user system (e.g., user interface 112 of user system 110 of FIG. 1). In response to a user interacting with simple mode button 605, the graphical user interface updates to display graphical user interface 600. In response to a user interacting with reduction window interface 705, the graphical user interface updates to display 800. In response to a user interacting with similarity threshold interface 710, the graphical user interface updates to display 900. In response to a user interacting with reducer partitioning interface 715, the graphical user interface updates to display 1000. In response to a user interacting with reduction overrides interface 720, the graphical user interface updates to display 1100. In response to a user interacting with summarization configuration interface 725, the graphical user interface updates to display 1200.

Figure 8:
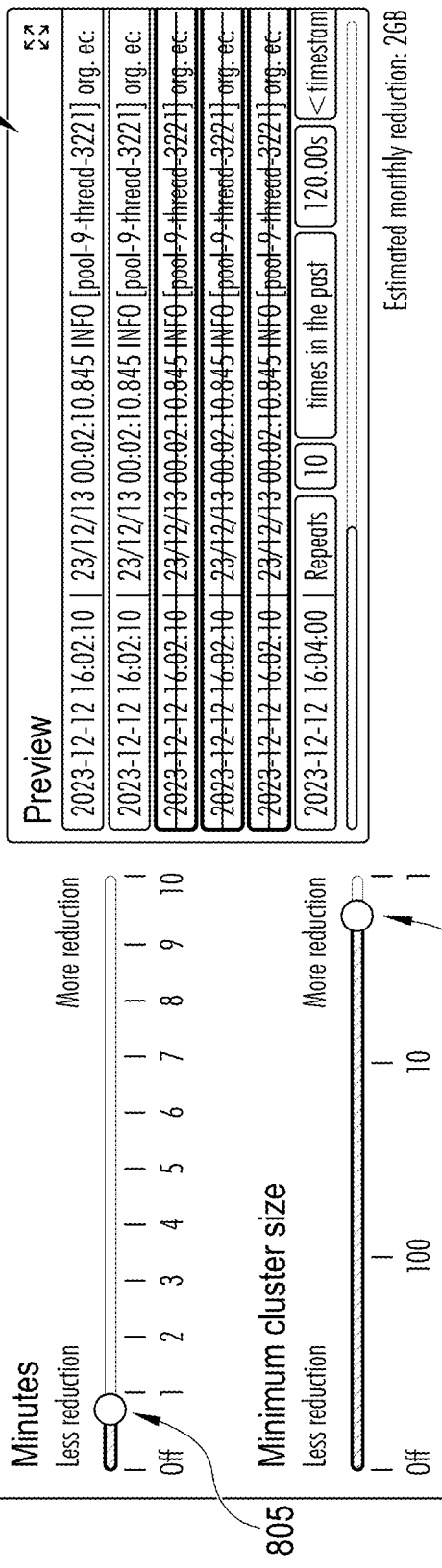
FIG. 8 illustrates another exemplary graphical user interface for configuring a log message aggregator in accordance with some embodiments of the present disclosure.

FIG. 8 illustrates another exemplary graphical user interface 800 for configuring a log message aggregator in accordance with some embodiments of the present disclosure. Graphical user interface 800 can be the graphical user interface of a user system (e.g., user interface 112 of user system 110 of FIG. 1). As shown in FIG. 8, graphical user interface 800 includes time window slider 805, cluster size slider 810, and reduction preview display 815.

In some embodiments, in response to a user interacting with time window slider 805 (and interacting with apply changes button 675 of FIG. 6), the user system associated with graphical user interface 800 sends the log message aggregator configuration parameters associated with the selected reduction policy to a log message aggregator (e.g., log message aggregator 150 of FIGS. 1-5). For example, in response to a user interacting with graphical user interface 800 to set time window slider 805 to one minute and interacting with the apply changes button, user system 110 sends a time window selection corresponding with one minute to log message aggregator 150. Accordingly, aggregation nodes 210, 220, 230, 510, 515, and/or 520 maintain aggregator states for their respective sub-streams for one minute time windows.

In some embodiments, in response to a user interacting with cluster size slider 810 (and interacting with apply changes button 675 of FIG. 6), the user system associated with graphical user interface 800 sends the log message aggregator configuration parameters associated with the selected reduction policy to a log message aggregator (e.g., log message aggregator 150 of FIGS. 1-5). For example, in response to a user interacting with graphical user interface 800 to set cluster size slider 810 to ten and interacting with the apply changes button, user system 110 sends an aggregation threshold of ten to log message aggregator 150. Accordingly, aggregation nodes 210, 220, 230, 510, 515, and/or 520 do not generate aggregations for log messages until there are at least ten log messages for a given pattern.

In some embodiments, in response to a user interacting with one or both of time window slider 805 and cluster size slider 810, reduction preview display 815 updates to display how the displayed log messages (e.g., displayed on user interface 112) change as a result of the reduction policy (e.g., time window slider 805 and/or cluster size slider 810 selection).

Figure 9:
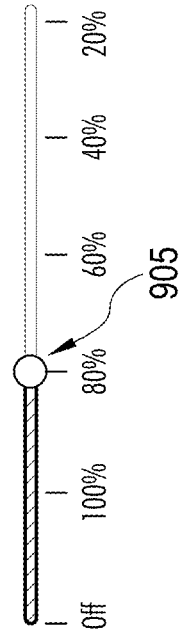
FIG. 9 illustrates another exemplary graphical user interface for configuring a log message aggregator in accordance with some embodiments of the present disclosure.

FIG. 9 illustrates another exemplary graphical user interface 900 for configuring a log message aggregator in accordance with some embodiments of the present disclosure. Graphical user interface 900 can be the graphical user interface of a user system (e.g., user interface 112 of user system 110 of FIG. 1). As shown in FIG. 9, graphical user interface 900 includes similarity threshold slider 905 and reduction preview display 910.

In some embodiments, in response to a user interacting with similarity threshold slider 905 (and interacting with apply changes button 675 of FIG. 6), the user system associated with graphical user interface 900 sends the log message aggregator configuration parameters associated with the selected reduction policy to a log message aggregator (e.g., log message aggregator 150 of FIGS. 1-5). For example, in response to a user interacting with graphical user interface 900 to set similarity threshold slider 905 to 80% and interacting with the apply changes button, user system 110 sends a similarity threshold of 80% to log message aggregator 150. Accordingly, aggregation nodes 210, 220, 230, 510, 515, and/or 520 do not include log messages in a given cluster unless the similarity score is at least 80%.

In some embodiments, in response to a user interacting with similarity threshold slider 905, reduction preview display 910 updates to display how the displayed log messages (e.g., displayed on user interface 112) change as a result of the reduction policy (e.g., similarity threshold slider 905 selection).

FIG. 10 illustrates an exemplary graphical user interface 1000 for configuring a log message aggregator in accordance with some embodiments of the present disclosure. Graphical user interface 1000 can be the graphical user interface of a user system (e.g., user interface 112 of user system 110 of FIG. 1). As shown in FIG. 10, graphical user interface 1000 includes partition identifiers 1005, 1010, and 1015 and reduction preview display 1020.

In some embodiments, in response to a user interacting with one of partition identifiers 1005, 1010, and 1015 (and interacting with apply changes button 675 of FIG. 6), the user system associated with graphical user interface 1000 sends the log message aggregator configuration parameters associated with the selected reduction policy to a log message aggregators (e.g., log message aggregator 150 of FIGS. 1-5). For example, in response to a user interacting with graphical user interface 1000 to select partition identifier 1005 to partition by host and service and interacting with the apply changes button, user system 110 sends a partition identifier to log message aggregator 150. Accordingly, allocators 205 and/or 505 allocate log messages to aggregation nodes 210, 220, 230, 510, 515, and 520 based on the host and service included in the structured data for the log messages.

In some embodiments, in response to a user interacting with partition identifiers 1005, 1010, and 1015, reduction preview display 1020 updates to display how the displayed log messages (e.g., displayed on user interface 112) change as a result of the reduction policy (e.g., partition identifier 1005 selection).

Figure 11:
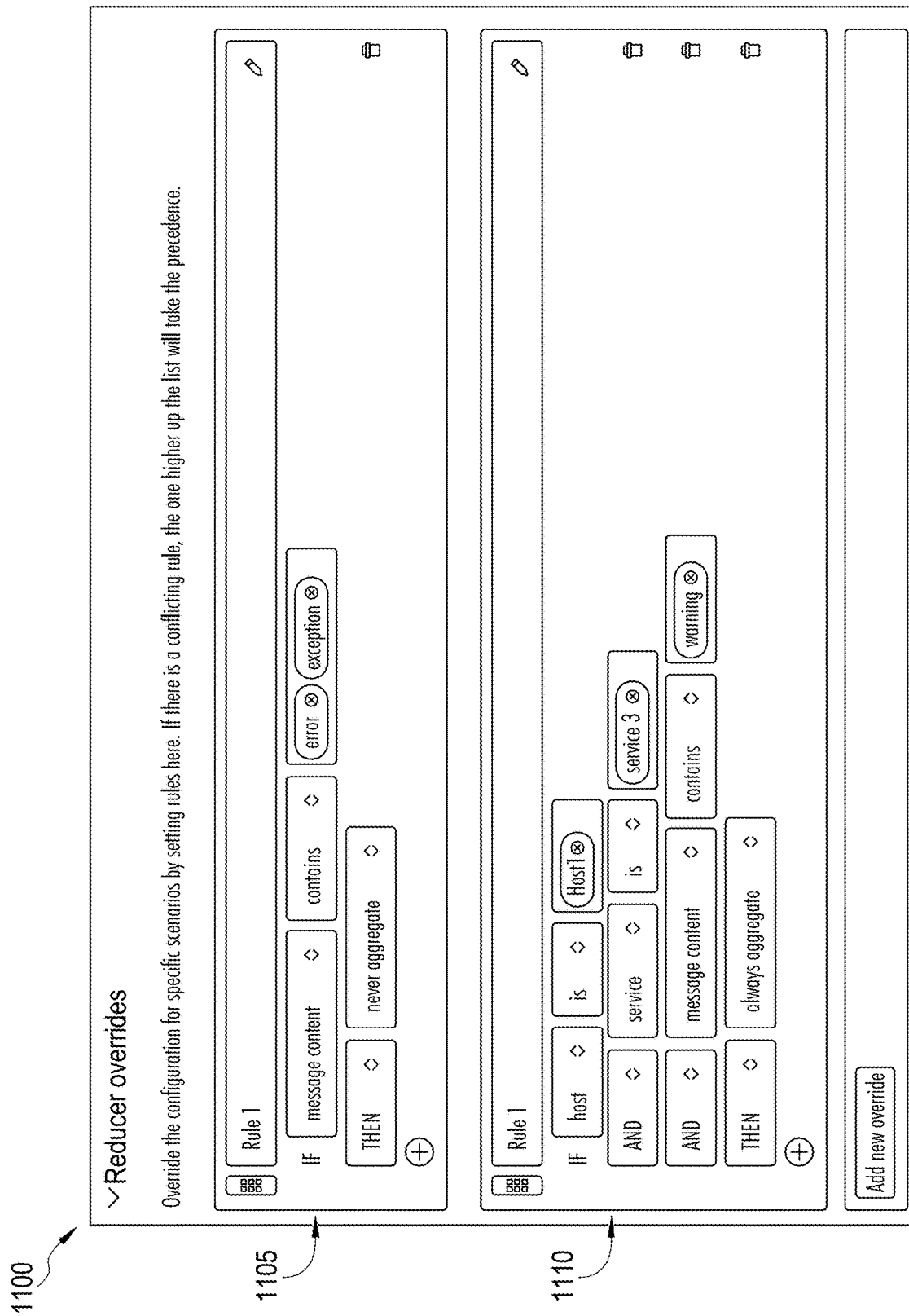
FIG. 11 illustrates another exemplary graphical user interface for configuring a log message aggregator in accordance with some embodiments of the present disclosure.

FIG. 11 illustrates another exemplary graphical user interface 1100 for configuring a log message aggregator in accordance with some embodiments of the present disclosure. Graphical user interface 1100 can be the graphical user interface of a user system (e.g., user interface 112 of user system 110 of FIG. 1). As shown in FIG. 11, graphical user interface 1100 includes first rule interface 1105 and second rule interface 1110.

In some embodiments, in response to a user interacting with one of first and second rule interfaces 1105 and 1110 (and interacting with apply changes button 675 of FIG. 6), the user system associated with graphical user interface 1100 sends the log message aggregator configuration parameters associated with the selected reduction policy to a log message aggregators (e.g., log message aggregator 150 of FIGS. 1-5). For example, in response to a user interacting with graphical user interface 1100 to input rules into one or both of first rule interface 1105 and second rule interface 1110 and interacting with the apply changes button, user system 110 sends an aggregation override to log message aggregator 150. Accordingly, log message aggregator 150 will aggregate based on the aggregation override. For example, log message aggregator 150 may never aggregate certain log messages or may always aggregate certain log messages.

Figure 12:
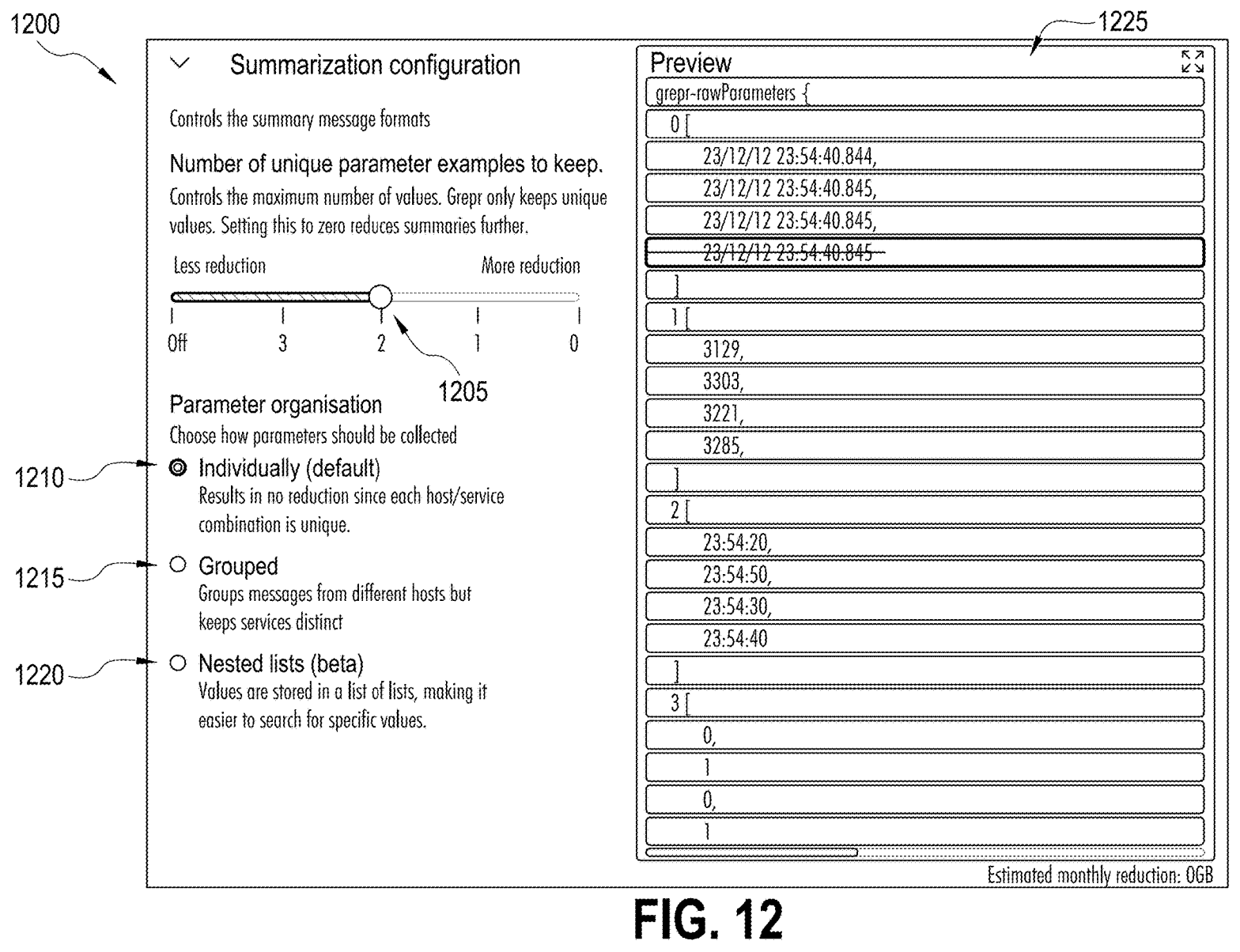

FIG. 12 illustrates another exemplary graphical user interface 1200 for configuring a log message aggregator in accordance with some embodiments of the present disclosure. Graphical user interface 1200 can be the graphical user interface of a user system (e.g., user interface 112 of user system 110 of FIG. 1). As shown in FIG. 12, graphical user interface 1200 includes parameter example selection slider 1205, parameter organization selection buttons 1210, 1215, and 1220, and reduction preview display 1225.

In some embodiments, in response to a user interacting with one of parameter example selection slider 1205 and/or parameter organization selection buttons 1210, 1215, and 1220 (and interacting with apply changes button 675 of FIG. 6), the user system associated with graphical user interface 1200 sends the log message aggregator configuration parameters associated with the selected reduction policy to a log message aggregators (e.g., log message aggregator 150 of FIGS. 1-5). For example, in response to a user interacting with graphical user interface 1200 to select a parameter example number of two, user system 110 sends the parameter example number to log message aggregator 150. Accordingly, aggregation nodes 210, 220, 230, 510, 515, and/or 520 will store two values for each parameter when clustering.

In some embodiments, in response to a user interacting parameter example selection slider 1205 and/or parameter organization selection buttons 1210, 1215, and/or 1220, reduction preview display 1225 updates to display how the displayed log messages (e.g., displayed on user interface 112) change as a result of the reduction policy (e.g., parameter example selection slider 1205 selection).

Figure 13:
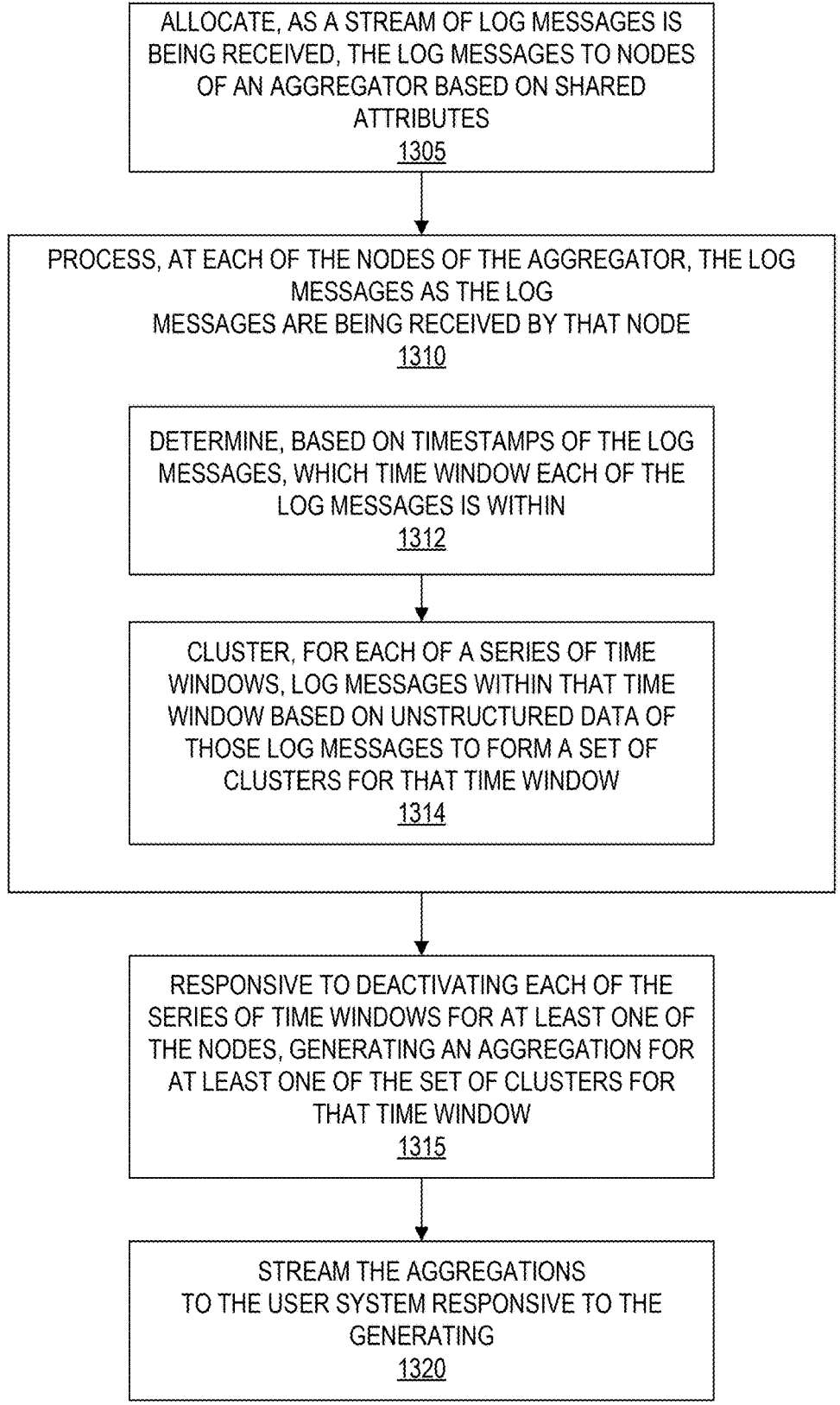
FIG. 13 illustrates a flow diagram for network log message aggregation using tokens in accordance with some embodiments of the present disclosure.

FIG. 13 illustrates a flow diagram for network log message aggregation using tokens in accordance with some embodiments of the present disclosure. The method 1300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1300 is performed by log message aggregator 150 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 1305, the processing device allocates, as a stream of log messages is being received, the log messages to nodes of an aggregator based on shared attributes. For example, allocator 205 of log message aggregator 150 allocates one or more sub-streams of log messages to at least one of aggregation nodes 210, 220, and 230 based on attributes of the log messages based on the unstructured data of the log messages. In some embodiments, the processing device allocates the log messages to nodes of the aggregator based on structured data of the log messages. Further details regarding allocating the log messages to nodes of an aggregator based on shared attributes are described with reference to FIGS. 2-5.

At operation 1310, the processing device processes, at each of the nodes of the aggregator, the log messages as the log messages are being received by that node. For example, each of aggregation nodes 210, 220, and 230 receives one or more sub-streams of log messages of log messages 202. Each of aggregation nodes 210, 220, and 230 process the sub-streams to generate aggregations. Further details regarding processing the log messages are discussed with reference to FIGS. 2-5.

At operation 1312, the processing device determines, based on timestamps of the log messages, which time window each of the log messages is within. For example, aggregation nodes 210, 220, and/or 230 determine a time window for each of the log messages in their respective sub-streams based on the timestamps of those log messages. Further details regarding determining which time window each of the log messages is within are discussed with reference to FIG. 4.

At operation 1314, the processing device clusters, for each of a series of time windows, log messages within that time window based on unstructured data of those log messages to form a set of clusters for that time window. For example, aggregation nodes 210, 220, and/or 230 calculate similarity scores for pairs of log messages and clusters and add log messages to clusters with the highest similarity score. In some embodiments, aggregation nodes 210, 220, and/or 230 add the log message to a cluster in response to the similarity score between the log message and the cluster satisfying a similarity threshold. Further details regarding clustering log messages based on unstructured data are discussed with reference to FIG. 4.

At operation 1315, the processing device generates an aggregation for at least one of the set of clusters for a time window in response to deactivating each of the series of time windows for at least one of the nodes. For example, aggregation node 210 generates $1^{st}$ sub-stream $1^{st}$ time window aggregation 412 in response to a trigger. The trigger includes, for example, a determination that a processing time for the cluster satisfies a threshold. Further details regarding generating an aggregation for the clusters are discussed with reference to FIG. 4.

At operation 1320, the processing device streams the aggregations to the user system in response to generating the aggregations. For example, log message aggregator 150 sends aggregations 204 to user system 110. Further details regarding streaming the aggregations to the user system are discussed with reference to FIGS. 2-5.

Figure 14:
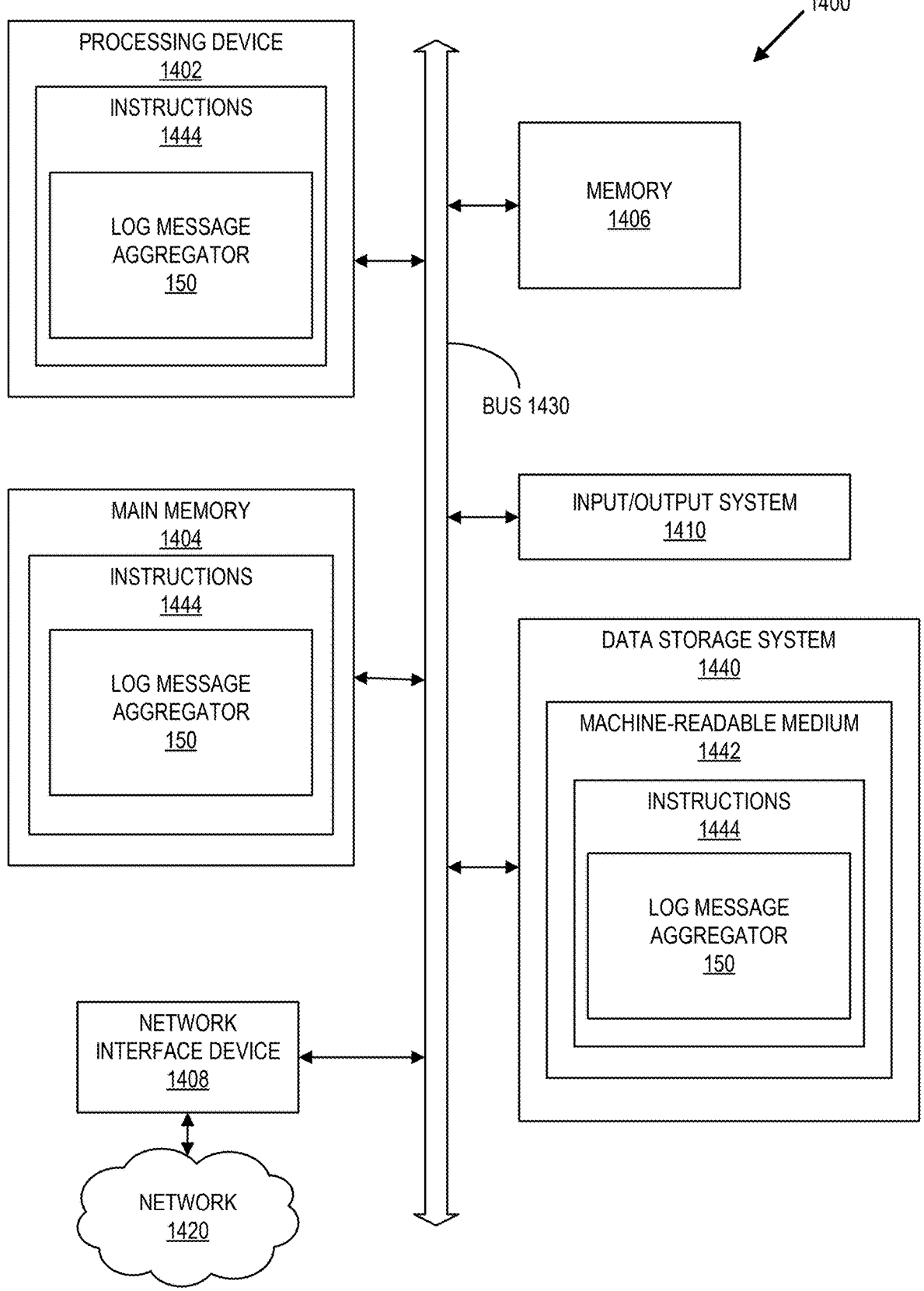
FIG. 14 is a block diagram of an example computer system in which embodiments of the present disclosure can operate.

FIG. 14 illustrates an example machine of a computer system 1400 within which a set of instructions for causing the machine to perform any one or more of the methodologies discussed herein, can be executed. In some embodiments, the computer system 1400 can correspond to a component of a networked computer system (e.g., computing system 100 of FIG. 1) that includes, is coupled to, or utilizes a machine to execute an operating system to perform operations corresponding to log message aggregator 150 of FIG. 1. The machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a smart phone, a tablet PC, a set-top box (STB), a Personal Digital Assistant (PDA), a cellular telephone, a web appliance, a server, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1400 includes a processing device 1402, a main memory 1404 (e.g., read-only memory (ROM), flash memory, dynamic random-access memory (DRAM) such as synchronous DRAM (SDRAM) or Rambus DRAM (RDRAM), etc.), a memory 1406 (e.g., flash memory, static random-access memory (SRAM), etc.), an input/output system 1410, and a data storage system 1440, which communicate with each other via a bus 1430.

Processing device 1402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1402 can also be one or more special-purpose processing devices such as an application specific integrated circuit (ASIC), a field programmable gate array (FPGA), a digital signal processor (DSP), network processor, or the like. The processing device 1402 is configured to execute instructions 1444 for performing the operations and steps discussed herein.

The computer system 1400 can further include a network interface device 1408 to communicate over the network 1420. Network interface device 1408 can provide a two-way data communication coupling to a network. For example, network interface device 1408 can be an integrated-services digital network (ISDN) card, cable modem, satellite modem, or a modem to provide a data communication connection to a corresponding type of telephone line. As another example, network interface device 1408 can be a local area network (LAN) card to provide a data communication connection to a compatible LAN. Wireless links can also be implemented. In any such implementation, network interface device 1408 can send and receive electrical, electromagnetic or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic or optical signals that carry digital data to and from computer system computer system 1400.

Computer system 1400 can send messages and receive data, including program code, through the network(s) and network interface device 1408. In the Internet example, a server can transmit a requested code for an application program through the Internet and network interface device 1408. The received code can be executed by processing device 1402 as it is received, and/or stored in data storage system 1440, or other non-volatile storage for later execution.

The input/output system 1410 can include an output device, such as a display, for example a liquid crystal display (LCD) or a touchscreen display, for displaying information to a computer user, or a speaker, a haptic device, or another form of output device. The input/output system 1410 can include an input device, for example, alphanumeric keys and other keys configured for communicating information and command selections to processing device 1402. An input device can, alternatively or in addition, include a cursor control, such as a mouse, a trackball, or cursor direction keys for communicating direction information and command selections to processing device 1402 and for controlling cursor movement on a display. An input device can, alternatively or in addition, include a microphone, a sensor, or an array of sensors, for communicating sensed information to processing device 1402. Sensed information can include voice commands, audio signals, geographic location information, and/or digital imagery, for example.

The data storage system 1440 can include a machine-readable storage medium 1442 (also known as a computer-readable medium) on which is stored one or more sets of instructions 1444 or software embodying any one or more of the methodologies or functions described herein. The instructions 1444 can also reside, completely or at least partially, within the main memory 1404 and/or within the processing device 1402 during execution thereof by the computer system 1400, the main memory 1404 and the processing device 1402 also constituting machine-readable storage media.

In one embodiment, the instructions 1444 include instructions to implement functionality corresponding to a log message aggregator (e.g., log message aggregator 150 of FIG. 1). While the machine-readable storage medium 1442 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

One or more parts of the above embodiments may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (such as instructions 1444 of FIG. 14). Instructions may be executed by hardware to perform operations. Executing software includes executing code, which includes executing instructions. The execution of a program to perform a task involves executing some or all the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals-such as carrier waves, and/or infrared signals). For instance, typical electronic devices also include a set of one or more physical network interface(s) (e.g., network 120 of FIG. 1 and/or network 1420 of FIG. 14) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, endpoints, or end user devices; or more specifically referred to as mobile devices, desktops, desktop computers, workstations, laptops, personal digital assistants, smartphones, wearables, augmented reality (AR) devices, virtual reality (VR) devices, mixed reality (MR) devices, embedded devices, Internet-of-Things devices (e.g., cameras, lighting, refrigerators, security systems, smart speakers, and thermostats), etc. The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

In the above description, numerous specific details such as resource partitioning/sharing/duplication embodiments, types and interrelationships of system components, and logic partitioning/integration choices are set forth to provide a more thorough understanding. The invention may be practiced without such specific details, however. In other instances, control structures, logic embodiments, opcodes, means to specify operands, and full software instruction sequences have not been shown in detail since those of ordinary skill in the art, with the included descriptions, will be able to implement what is described without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, and/or characteristic is described in connection with an embodiment, one skilled in the art would know to affect such feature, structure, and/or characteristic in connection with other embodiments whether explicitly described.

Bracketed text and blocks with dashed borders (e.g., large dashes, small dashes, dot-dash, and dots) may be used herein to illustrate optional operations and/or structures that add additional features to some embodiments. However, such notation should not be taken to mean that these are the only options or optional operations, and/or that blocks with solid borders are not optional in certain embodiments.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain embodiments, such order is exemplary and not limiting (e.g., alternative embodiments may perform the operations in a different order, combine certain operations, perform certain operations in parallel, overlap performance of certain operations such that they are partially in parallel, etc.).

While the above description includes several example embodiments, the invention is not limited to the embodiments described and can be practiced with modification and alteration within the spirit and scope of the appended claims. The description is thus illustrative instead of limiting.

What is claimed is:

1. A method performed by a streaming aggregator comprising:
    allocating, as a stream of log messages is being received, the log messages to a plurality of nodes of an aggregator based on different ones of the log messages sharing one or more of attributes, wherein each of the plurality of nodes of the aggregator is allocated a respective sub-stream of the log messages, wherein the log messages regard network events of a user system, wherein each of the log messages comprises unstructured data and a timestamp indicating when the respective one of the network events occurred, and wherein the attributes are based on the unstructured data;
    processing, at each of the plurality of nodes of the aggregator, the log messages of the respective sub-stream as the log messages are being received by that node, wherein the processing includes:
        determining, based on the timestamps of the log messages of the respective sub-stream, which time window, of a series of time windows, each of the log messages is within; and
        clustering, for each active one of the series of time windows, the log messages within that time window based on the unstructured data of those log messages to form a set of clusters for that time window;
    responsive to deactivating each of the series of time windows for at least one of the plurality of nodes, generating an aggregation for at least one of the set of clusters for that time window; and
    streaming the aggregations to the user system responsive to the generating.

2. The method of claim 1, wherein each of the log messages further comprises structured data and wherein allocating the log messages to the plurality of nodes of the aggregator is further based on the structured data.

3. The method of claim 2, further comprising:
    receiving, from the user system, in response to a user of the user system interacting with a user interface of the user system, a partition identifier for structured data of the log messages, wherein allocating the log messages to the plurality of nodes of the aggregator allocates different ones of the log messages sharing the structured data identified by the partition identifier to a same node of the plurality of nodes.

4. The method of claim 1, further comprising:
    receiving, from the user system, in response to a user of the user system interacting with a user interface of the user system, a time window selection; and
    determining each of the series of time windows using the time window selection.

5. The method of claim 1, further comprising:
receiving, from the user system, in response to a user of the user system interacting with a user interface of the user system, a similarity threshold, wherein clustering the log messages based on the unstructured data of those log messages uses the similarity threshold.

6. The method of claim 1, wherein the processing, at each of the plurality of nodes of the aggregator, the log messages of the respective sub-stream as the log messages are being received by that node further includes:
determining, for each of the series of time windows for at least one of the plurality of nodes, that a number of log messages in at least one of the set of clusters for that time window satisfies an aggregation threshold, wherein generating the aggregation for the at least one of the set of clusters for that time window is in response to determining that the number of log messages satisfies the aggregation threshold.

7. The method of claim 6, further comprising:
receiving, from the user system, in response to a user of the user system interacting with a user interface of the user system, the aggregation threshold; and
streaming log messages of the at least one of the set of clusters to the user system until the number of log messages in the at least one of the set of clusters for that time window satisfies the aggregation threshold.

8. The method of claim 6, wherein clustering, for each active one of the series of time windows, log messages of the respective sub-stream, based on the unstructured data of those log messages comprises:
determining masks for the unstructured data of those log messages;
determining literals for the unstructured data of those log messages; and
determining punctuation for the unstructured data of those log messages, wherein forming the set of clusters for that active one of the series of time windows uses the masks, the literals, and the punctuation.

9. The method of claim 1, further comprising:
receiving, from the user system, in response to a user of the user system interacting with a user interface of the user system, an aggregation override identifying one or more values for the unstructured data, wherein clustering, for each active one of the series of time windows, log messages of the respective sub-stream to form the set of clusters for that active one of the series of time windows is based on the one or more values identified by the aggregation override.

10. The method of claim 1, further comprising:
receiving, at each of a plurality of nodes of a local aggregator, a local sub-stream of the stream of log messages; and
processing, at each of the plurality of nodes of the local aggregator, the log messages of the respective local sub-stream as the log messages are being received by that node, wherein the processing includes:
determining, based on the timestamps of the log messages of the respective local sub-stream, which local time window, of a series of local time windows, each of the log messages is within; and
clustering, for each active one of the series of local time windows, the log messages within that time window based on the unstructured data of those log messages to form a set of local clusters for that time window, wherein allocating the log messages to the plurality of nodes of the aggregator is further based on different ones of the log messages sharing a local cluster.

11. The method of claim 1, wherein processing, at each of the plurality of nodes of the aggregator, the log messages of the respective sub-stream further comprises:
determining, for each of the set of clusters for each of the series of time windows, a processing timestamp using a time that cluster was created; and
responsive to determining that a current time exceeds the processing time window by a processing threshold for at least one cluster of the set of clusters for at least one of the series of time windows, determining to deactivate the at least one cluster.

12. The method of claim 1, wherein processing, at each of the plurality of nodes of the aggregator, the log messages of the respective sub-stream further comprises:
determining, by the streaming aggregator, a watermark timestamp as a minimum of the timestamps of the log messages; and
responsive to determining that the watermark timestamp exceeds the time window for the at least one cluster, determining to deactivate the at least one cluster.

13. A non-transitory computer-readable storage medium comprising instructions that, when executed by a processing device, cause the processing device to:
allocate, as a stream of log messages is being received, the log messages to a plurality of nodes of an aggregator based on different ones of the log messages sharing one or more of attributes, wherein each of the plurality of nodes of the aggregator is allocated a respective sub-stream of the log messages, wherein the log messages regard network events of a user system, wherein each of the log messages comprises unstructured data and a timestamp indicating when the respective one of the network events occurred, and wherein the attributes are based on the unstructured data;
process, at each of the plurality of nodes of the aggregator, the log messages of the respective sub-stream as the log messages are being received by that node, wherein the processing includes:
determining, based on the timestamps of the log messages of the respective sub-stream, which time window, of a series of time windows, each of the log messages is within; and
clustering, for each active one of the series of time windows, the log messages within that time window based on the unstructured data of those log messages to form a set of clusters for that time window;
responsive to deactivating each of the series of time windows for at least one of the plurality of nodes, generate an aggregation for at least one of the set of clusters for that time window; and
stream the aggregations to the user system responsive to the generating.

14. The non-transitory computer-readable storage medium of claim 13, wherein each of the log messages further comprises structured data, wherein allocating the log messages to the plurality of nodes of the aggregator is further based on the structured data, and wherein the processing device is further to:
receive, from the user system, in response to a user of the user system interacting with a user interface of the user system, a partition identifier for structured data of the log messages, wherein allocating the log messages to the plurality of nodes of the aggregator allocates different ones of the log messages sharing the structured data identified by the partition identifier to a same node of the plurality of nodes.

15. The non-transitory computer-readable storage medium of claim 13, wherein the processing device is further to:
receive, from the user system, in response to a user of the user system interacting with a user interface of the user system, a time window selection; and
determine each of the series of time windows using the time window selection.

16. The non-transitory computer-readable storage medium of claim 13, wherein the processing device is further to:
receive, from the user system, in response to a user of the user system interacting with a user interface of the user system, a similarity threshold, wherein clustering the log messages based on the unstructured data of those log messages uses the similarity threshold.

17. The non-transitory computer-readable storage medium of claim 13, wherein the processing device is further to receive, from the user system, in response to a user of the user system interacting with a user interface of the user system, an aggregation threshold, and wherein the processing, at each of the plurality of nodes of the aggregator, the log messages of the respective sub-stream as the log messages are being received by that node further includes:
determining, for each of the series of time windows for at least one of the plurality of nodes, that a number of log messages in at least one of the set of clusters for that time window satisfies the aggregation threshold, wherein generating the aggregation for the at least one of the set of clusters for that time window is in response to determining that the number of log messages satisfies the aggregation threshold.

18. The non-transitory computer-readable storage medium of claim 17, wherein the processing device is further to:
receive, from the user system, in response to a user of the user system interacting with a user interface of the user system, the aggregation threshold; and
stream log messages of the at least one of the set of clusters to the user system until the number of log messages in the at least one of the set of clusters for that time window satisfies the aggregation threshold.

19. The non-transitory computer-readable storage medium of claim 17, wherein clustering, for each active one of the series of time windows, log messages of the respective sub-stream, based on the unstructured data of those log messages comprises:
determining masks for the unstructured data of those log messages;
determining literals for the unstructured data of those log messages; and
determining punctuation for the unstructured data of those log messages, wherein forming the set of clusters for that active one of the series of time windows uses the masks, the literals, and the punctuation.

20. The non-transitory computer-readable storage medium of claim 13, wherein the processing device is further to:
receive, at each of a plurality of nodes of a local aggregator, a local sub-stream of the stream of log messages; and
process, at each of the plurality of nodes of the local aggregator, the log messages of the respective local sub-stream as the log messages are being received by that node, wherein the processing includes:
determining, based on the timestamps of the log messages of the respective local sub-stream, which local time window, of a series of local time windows, each of the log messages is within; and
clustering, for each active one of the series of local time windows, the log messages within that time window based on the unstructured data of those log messages to form a set of local clusters for that time window, wherein allocating the log messages to the plurality of nodes of the aggregator is further based on different ones of the log messages sharing a local cluster.

21. The non-transitory computer-readable storage medium of claim 13, wherein processing, at each of the plurality of nodes of the aggregator, the log messages of the respective sub-stream further comprises:
determining, for each of the set of clusters for each of the series of time windows, a processing timestamp using a time that cluster was created; and
responsive to determining that a current time exceeds the processing time window by a processing threshold for at least one cluster of the set of clusters for at least one of the series of time windows, determining to deactivate the at least one cluster.

22. The non-transitory computer-readable storage medium of claim 13, wherein processing, at each of the plurality of nodes of the aggregator, the log messages of the respective sub-stream further comprises:
determining, by the streaming aggregator, a watermark timestamp as a minimum of the timestamps of the log messages; and
responsive to determining that the watermark timestamp exceeds the time window for the at least one cluster, determining to deactivate the at least one cluster.

23. A system comprising:
at least one memory device; and
a processing device, operatively coupled with the at least one memory device, to:
receive, at each of a plurality of nodes of a local aggregator, a local sub-stream of a stream of log messages, wherein the log messages regard network events of a user system and wherein each of the log messages comprises unstructured data and a timestamp indicating when the respective one of the network events occurred;
process, at each of the plurality of nodes of the local aggregator, the log messages of the respective local sub-stream as the log messages are being received by that node, wherein the processing includes:
determining, based on the timestamps of the log messages of the respective local sub-stream, which local time window, of a series of local time windows, each of the log messages is within; and
clustering, for each active one of the series of local time windows, the log messages within that time window based on the unstructured data of those log messages to form a set of local clusters for that time window;
allocate, as the stream of log messages is being received, the log messages to a plurality of nodes of an aggregator based on different ones of the log messages sharing one or more attributes and a local cluster, wherein each of the plurality of nodes of the aggregator is allocated a respective sub-stream of the log messages, and wherein the attributes are based on the unstructured data;
process, at each of the plurality of nodes of the aggregator, the log messages of the respective sub-stream as the log messages are being received by that node, wherein the processing includes:
determining, based on the timestamps of the log messages of the respective sub-stream, which time window, of a series of time windows, each of the log messages is within; and
clustering, for each active one of the series of time windows, the log messages within that time window based on the unstructured data of those log messages to form a set of clusters for that time window;
responsive to deactivating each of the series of time windows for at least one of the plurality of nodes, generate an aggregation for at least one of the set of clusters for that time window; and
stream the aggregations to the user system responsive to the generating.

24. The system of claim 23, wherein each of the log messages further comprises structured data, wherein allocating the log messages to the plurality of nodes of the aggregator is further based on the structured data, and wherein the processing device is further to:
receive, from the user system, in response to a user of the user system interacting with a user interface of the user system, a partition identifier for structured data of the log messages, wherein allocating the log messages to the plurality of nodes of the aggregator allocates different ones of the log messages sharing the structured data identified by the partition identifier to a same node of the plurality of nodes.

25. The system of claim 23, wherein the processing device is further to:
receive, from the user system, in response to a user of the user system interacting with a user interface of the user system, a time window selection; and
determine each of the series of time windows using the time window selection.

26. The system of claim 23, wherein the processing device is further to:
receive, from the user system, in response to a user of the user system interacting with a user interface of the user system, a similarity threshold, wherein clustering the log messages based on the unstructured data of those log messages uses the similarity threshold.

27. The system of claim 23, wherein the processing device is further to receive, from the user system, in response to a user of the user system interacting with a user interface of the user system, an aggregation threshold, and wherein the processing, at each of the plurality of nodes of the aggregator, the log messages of the respective sub-stream as the log messages are being received by that node further includes:
determining, for each of the series of time windows for at least one of the plurality of nodes, that a number of log messages in at least one of the set of clusters for that time window satisfies the aggregation threshold, wherein generating the aggregation for the at least one of the set of clusters for that time window is in response to determining that the number of log messages satisfies the aggregation threshold.

28. The system of claim 27, wherein the processing device is further to:
receive, from the user system, in response to a user of the user system interacting with a user interface of the user system, the aggregation threshold; and
stream log messages of the at least one of the set of clusters to the user system until the number of log messages in the at least one of the set of clusters for that time window satisfies the aggregation threshold.

29. The system of claim 27, wherein clustering, for each active one of the series of time windows, log messages of the respective sub-stream, based on the unstructured data of those log messages comprises:
determining masks for the unstructured data of those log messages;
determining literals for the unstructured data of those log messages; and
determining punctuation for the unstructured data of those log messages, wherein forming the set of clusters for that active one of the series of time windows uses the masks, the literals, and the punctuation.

30. The system of claim 23, wherein processing, at each of the plurality of nodes of the aggregator, the log messages of the respective sub-stream further comprises:
determining, for each of the set of clusters for each of the series of time windows, a processing timestamp using a time that cluster was created; and
responsive to determining that a current time exceeds the processing time window by a processing threshold for at least one cluster of the set of clusters for at least one of the series of time windows, determining to deactivate the at least one cluster.

* * * * *